US011711110B2

(12) United States Patent
Masuda et al.

(10) Patent No.: US 11,711,110 B2
(45) Date of Patent: Jul. 25, 2023

(54) COMMUNICATION SYSTEM, TRANSMISSION DEVICE, AND RECEPTION DEVICE

(71) Applicant: Sony Semiconductor Solutions Corporation, Kanagawa (JP)

(72) Inventors: Takashi Masuda, Tokyo (JP); Kentaro Yasunaka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 248 days.

(21) Appl. No.: 17/284,670

(22) PCT Filed: Oct. 3, 2019

(86) PCT No.: PCT/JP2019/039140
§ 371 (c)(1),
(2) Date: Apr. 12, 2021

(87) PCT Pub. No.: WO2020/080125
PCT Pub. Date: Apr. 23, 2020

(65) Prior Publication Data
US 2021/0359716 A1 Nov. 18, 2021

(30) Foreign Application Priority Data
Oct. 18, 2018 (JP) .................................. 2018-196633

(51) Int. Cl.
*H04B 3/10* (2006.01)
*H04B 3/54* (2006.01)
*H04L 25/03* (2006.01)

(52) U.S. Cl.
CPC ............... *H04B 3/10* (2013.01); *H04B 3/544* (2013.01); *H04L 25/03* (2013.01)

(58) Field of Classification Search
CPC ............ H04B 3/10; H04B 3/544; H04L 25/03
See application file for complete search history.

(56) References Cited

U.S. PATENT DOCUMENTS 6,901,244 B1    5/2005  Galperin et al.
8,699,585 B2 *  4/2014  Okamura ............... H04L 1/244
                                            398/94

(Continued)

FOREIGN PATENT DOCUMENTS

CN    101739577 A    6/2010
JP    S62231527 A   10/1987

(Continued)

OTHER PUBLICATIONS

International Search Report (PCT/ISA/210), International Application No. PCT/JP2019/039140, dated Oct. 18, 2019.

*Primary Examiner* — Brenda H Pham
(74) *Attorney, Agent, or Firm* — Michael Best & Friedrich LLP

(57) ABSTRACT

A communication system includes: a transmission device including a transmission data generator, a pattern generator, a transmitter, and a control signal receiver, the transmission data generator that is configured to generate transmission data, the pattern generator that is configured to generate an alternate pattern alternating at every lapse of a predetermined time, the transmitter that includes a first equalization circuit and is configured to transmit a transmission signal including the transmission data and the alternate pattern, the first equalization circuit that is configured to adjust equalization characteristics on the basis of first instruction information, and the control signal receiver that is configured to receive the first instruction information; and a reception device including a receiver, a first detector, and a control signal transmitter, the receiver that is configured to receive the transmission signal, the first detector that is configured to detect a frequency component corresponding to the predetermined time of the alternate pattern included in the transmission signal, and the control signal transmitter that is configured to generate the first instruction information on (Continued)

the basis of a result of detection by the first detector and is configured to transmit the first instruction information.

16 Claims, 21 Drawing Sheets

(56) References Cited

U.S. PATENT DOCUMENTS

| | | | |
|---|---|---|---|
| 2011/0038407 A1* | 2/2011 | Ki | H04L 25/03305 375/232 |
| 2015/0341138 A1 | 11/2015 | Ishihara et al. | |
| 2016/0036606 A1 | 2/2016 | Matsudaira | |
| 2018/0062883 A1 | 3/2018 | Duan | |

FOREIGN PATENT DOCUMENTS

| | | |
|---|---|---|
| JP | 2008-22392 A | 1/2008 |
| JP | 2014033347 A | 2/2014 |
| JP | 2017-28534 A | 2/2017 |
| WO | 2010/137113 A1 | 12/2010 |
| WO | 2014/112516 A1 | 7/2014 |

* cited by examiner

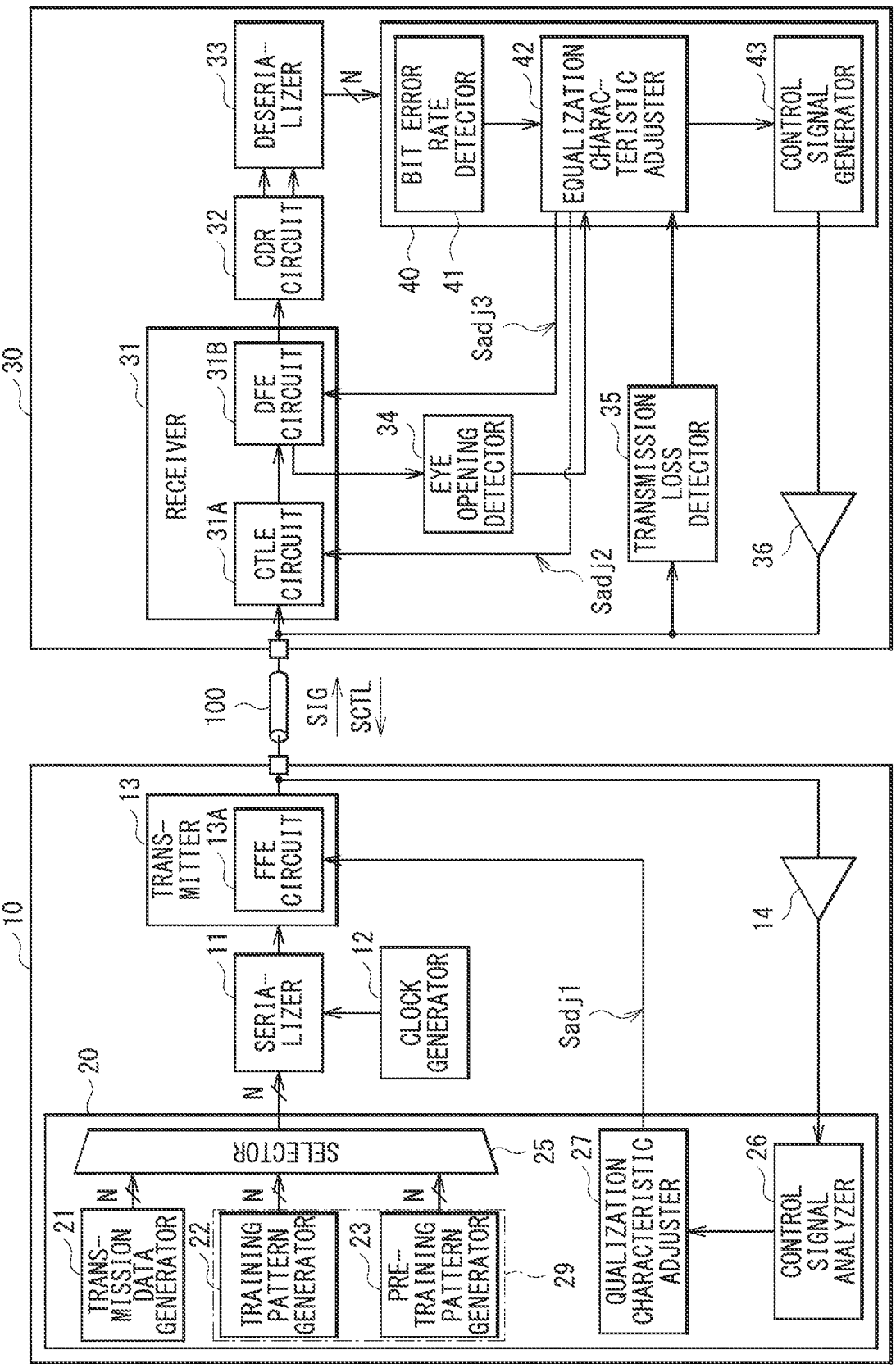
[FIG. 1]

[ FIG. 2 ]
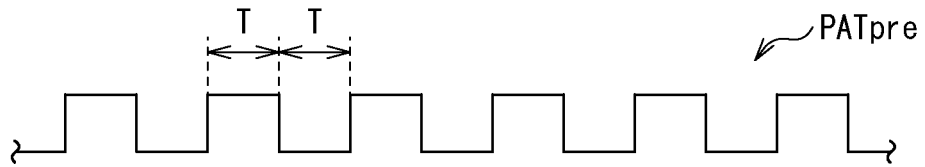
[ FIG. 3 ]
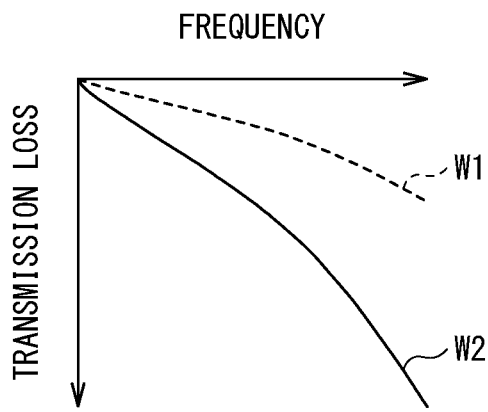
[ FIG. 4 ]
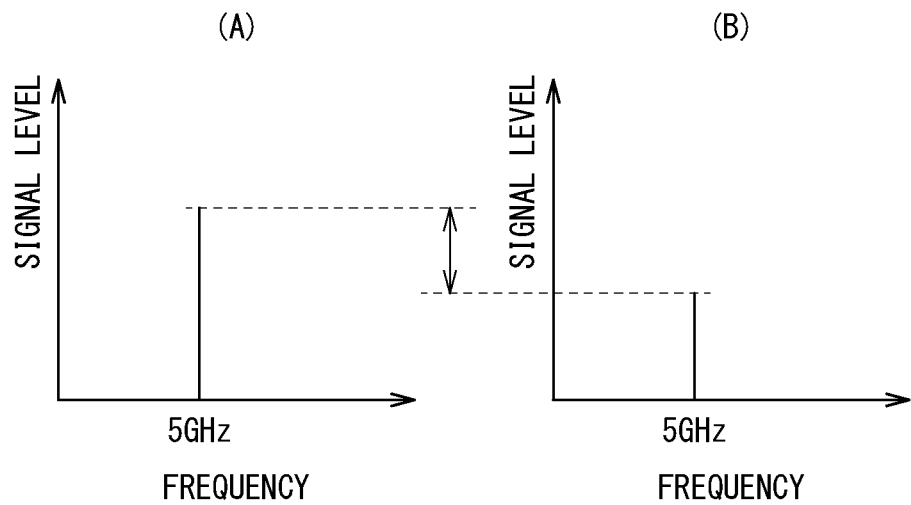

[ FIG.5 ]
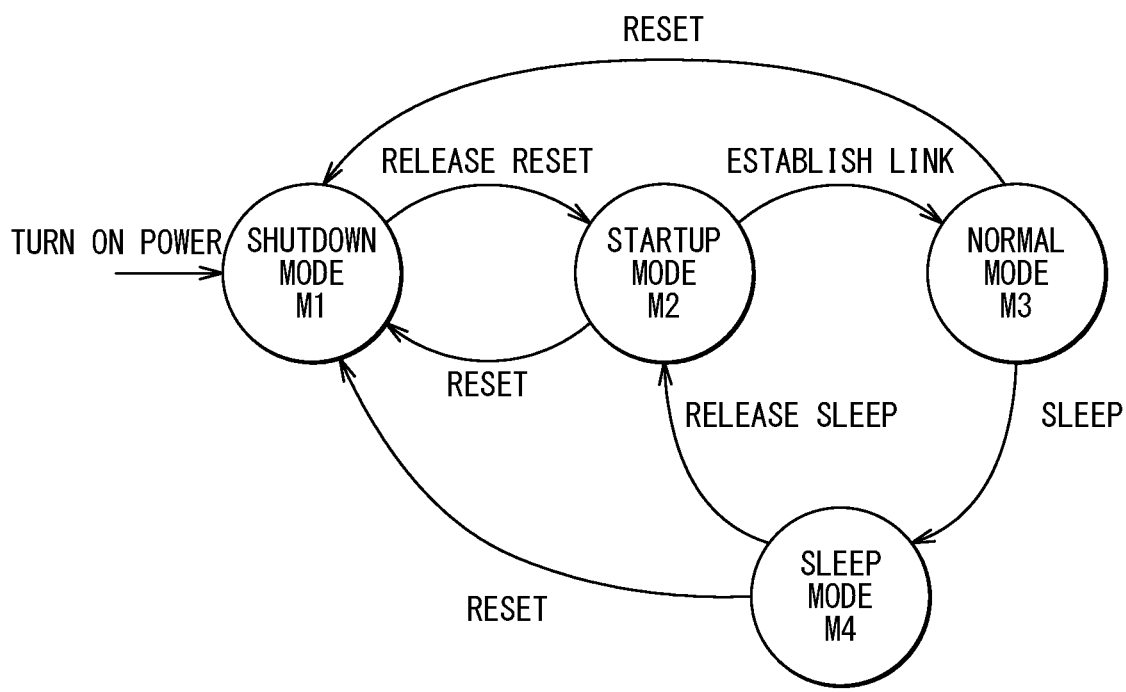

[FIG.6]
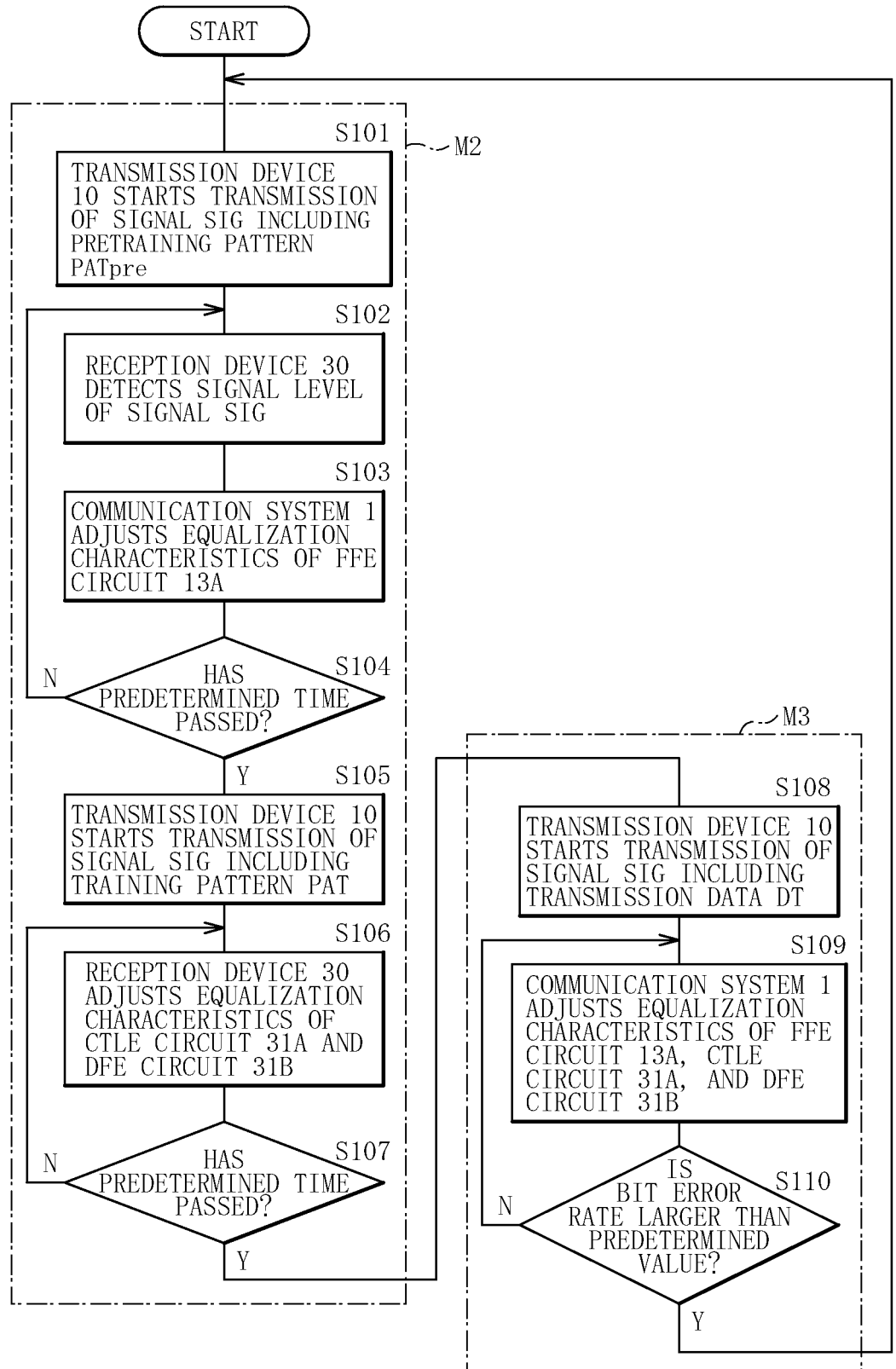

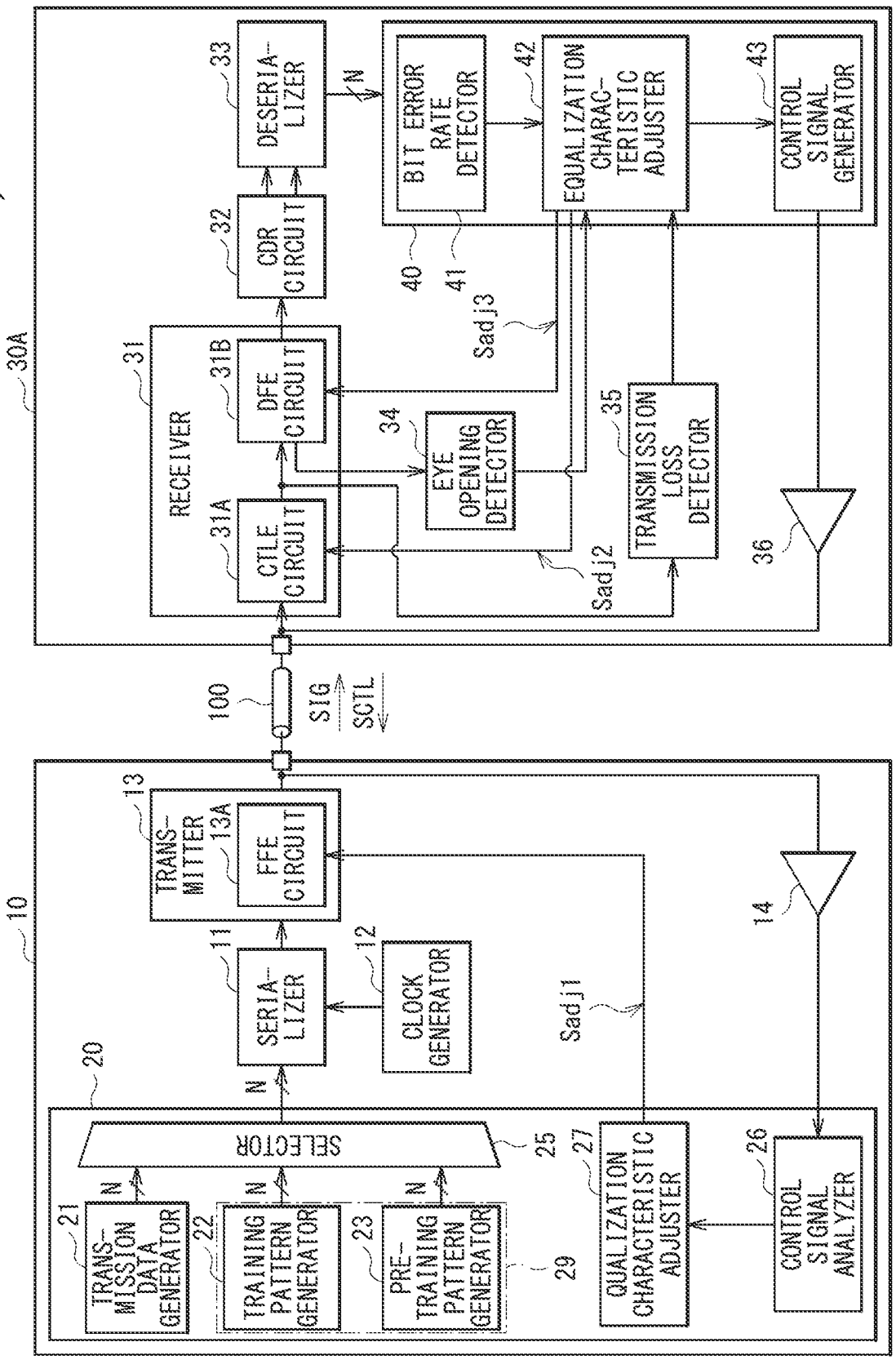
[FIG. 7]

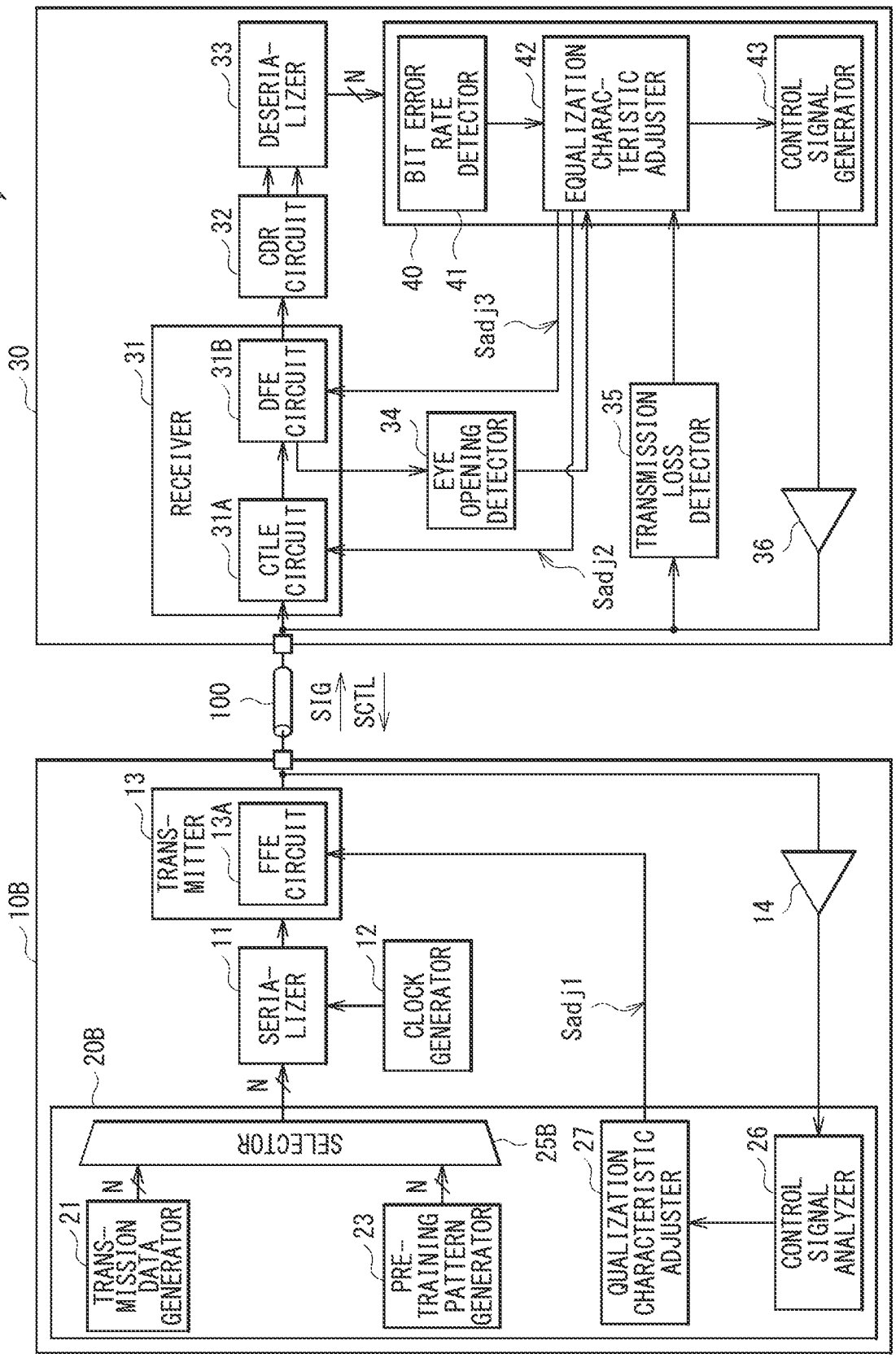
[FIG. 8]

[FIG. 9]
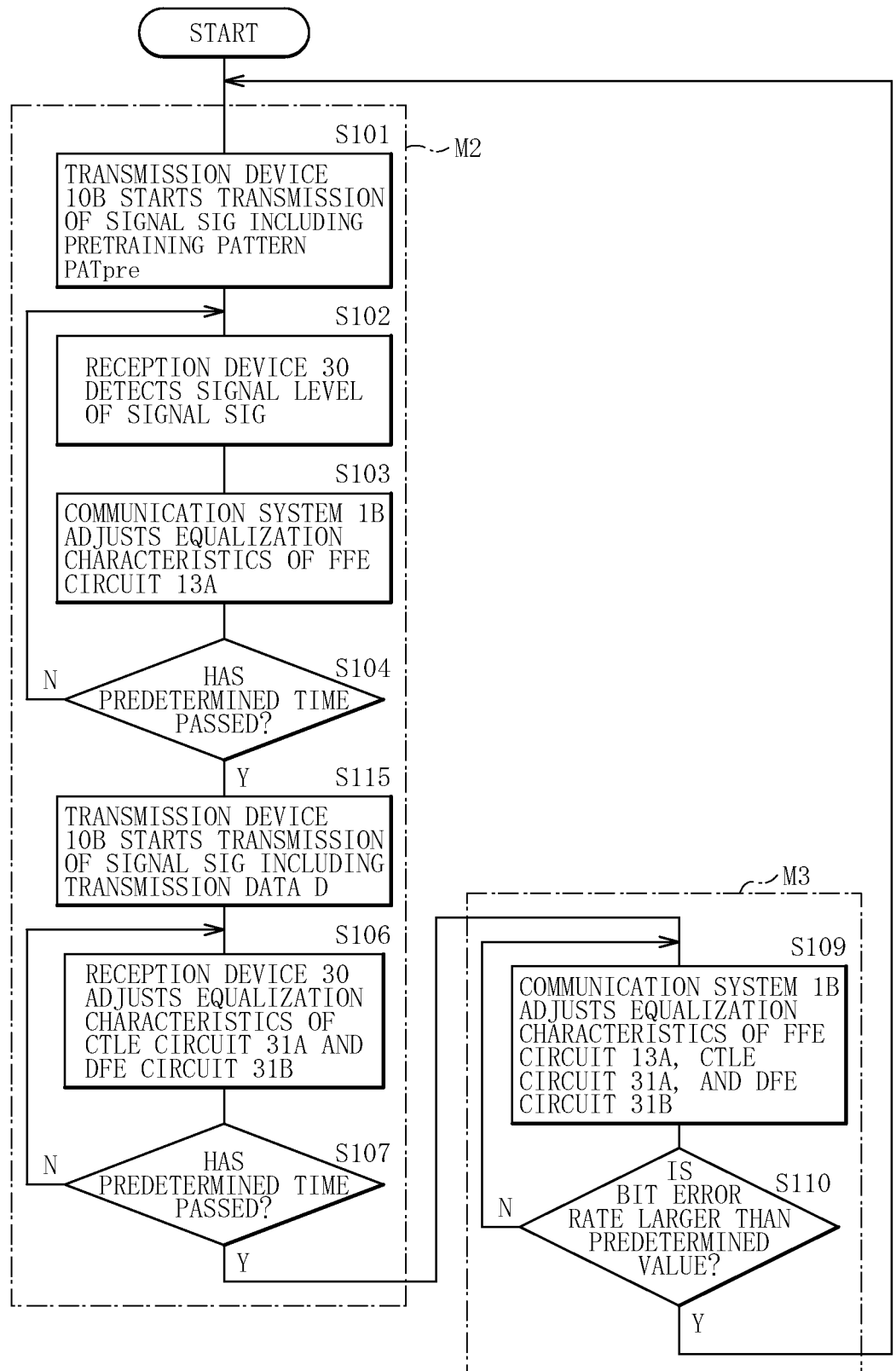

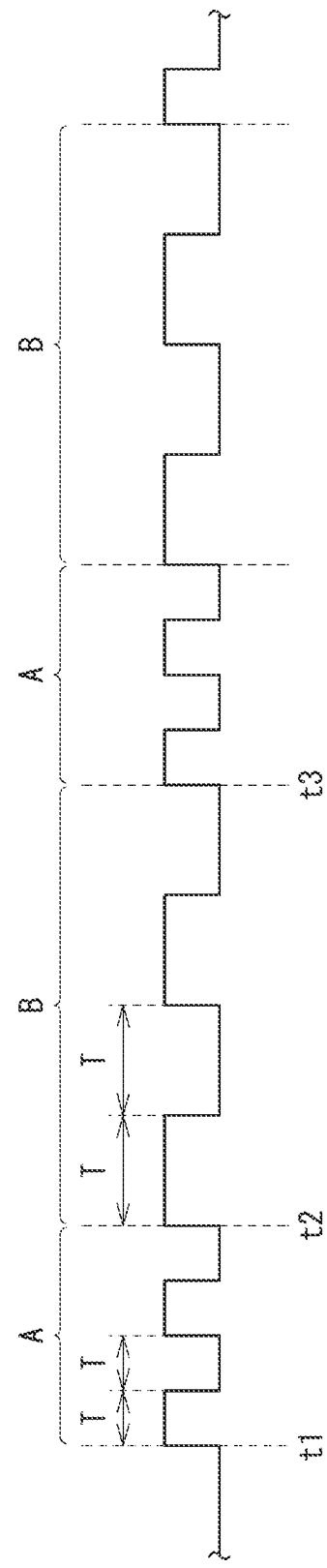

[ FIG. 11 ]
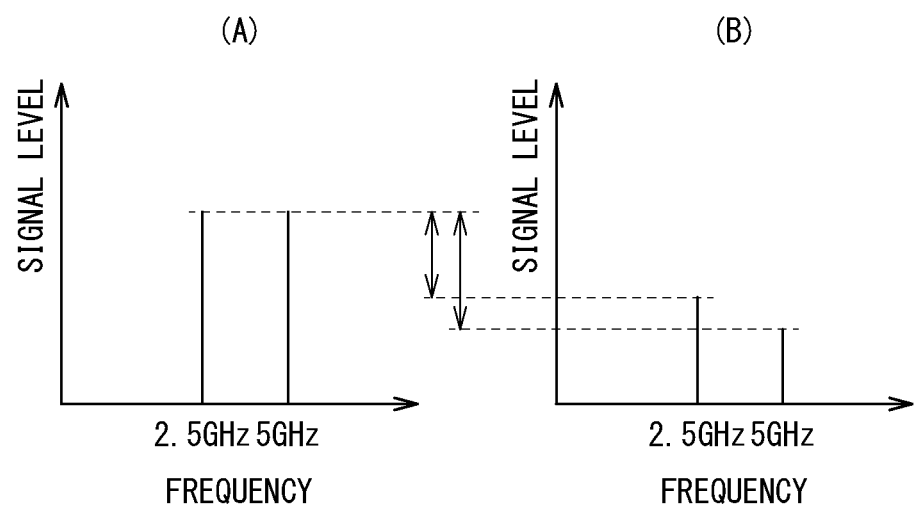

[FIG. 12]
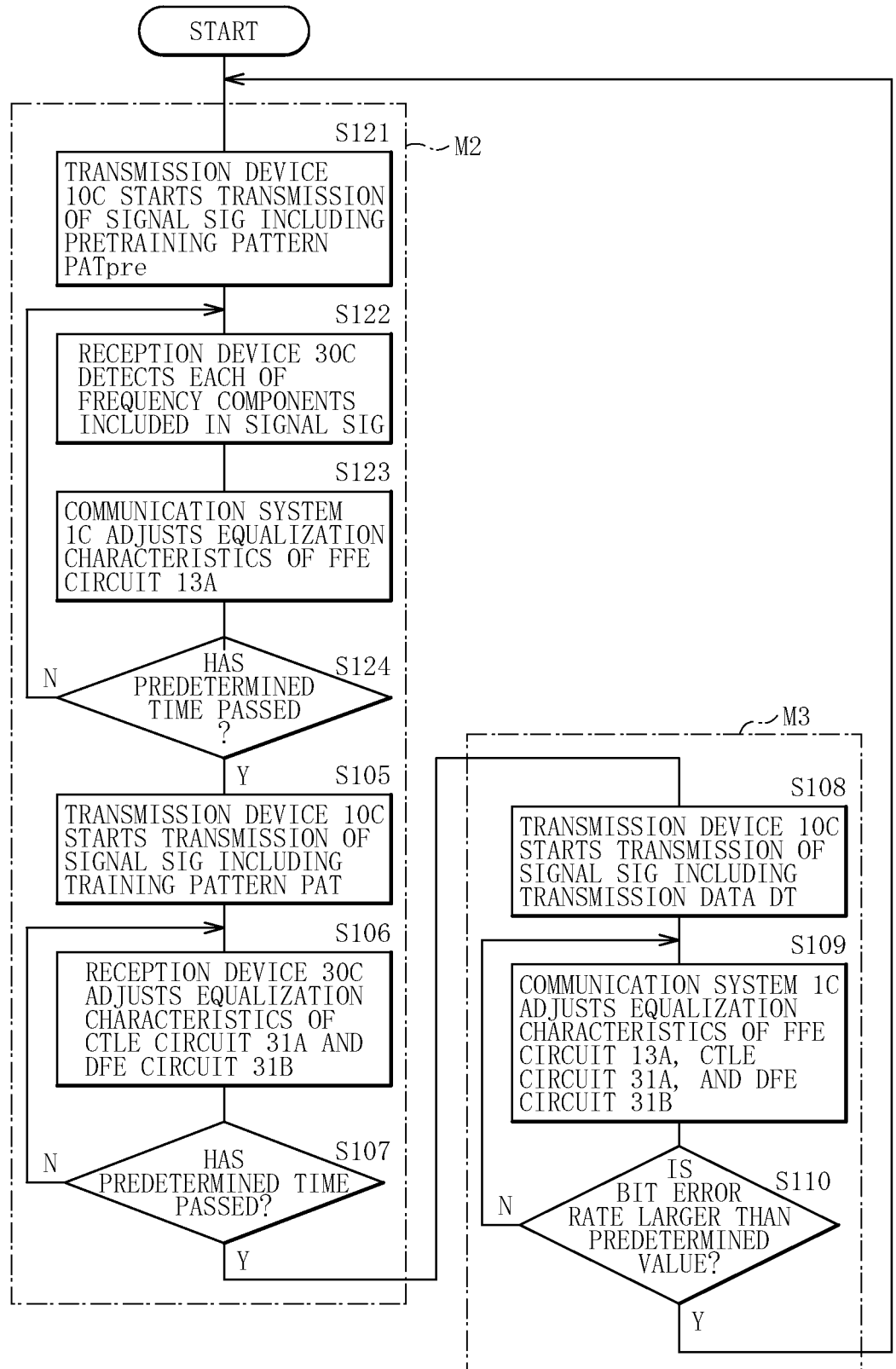

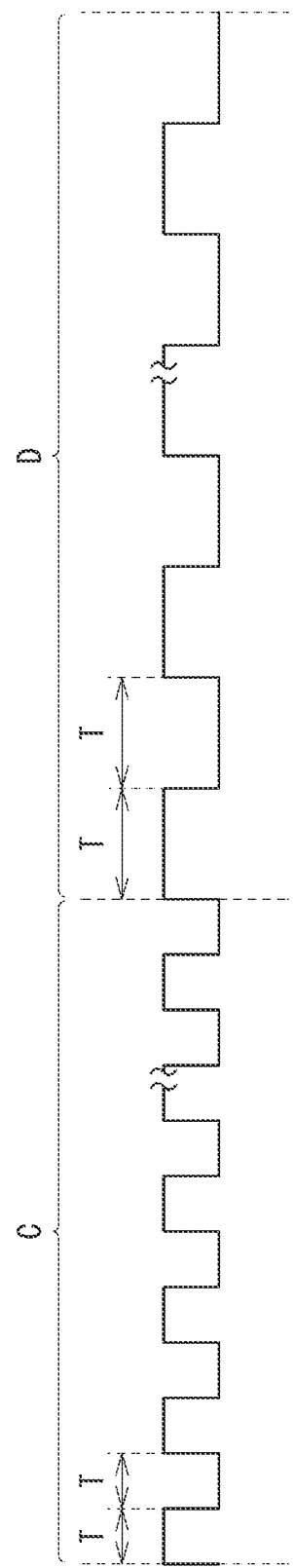

[ FIG. 14 ]
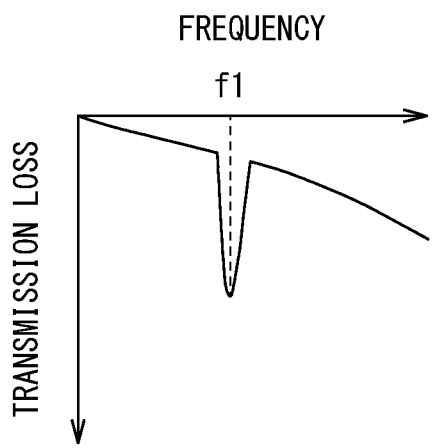
[ FIG. 15 ]
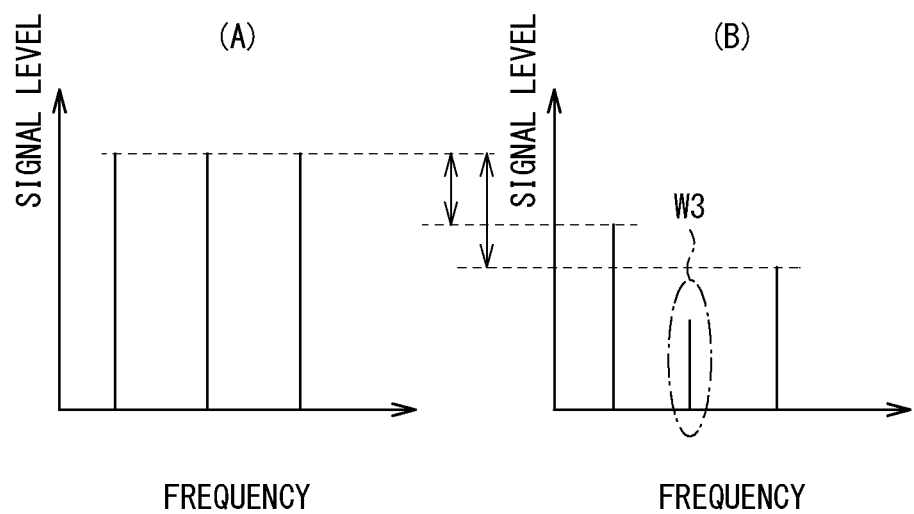

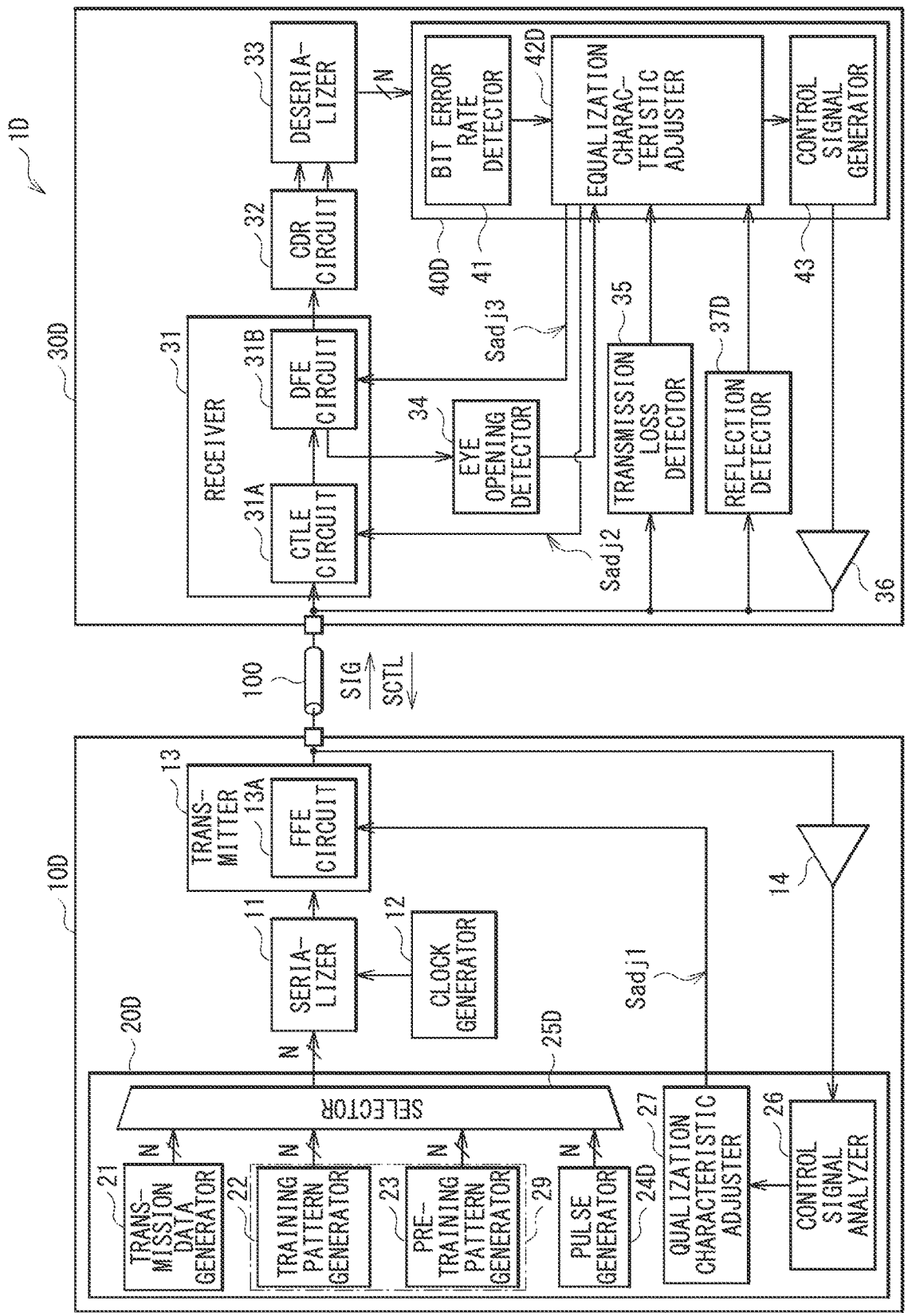
[FIG. 16]

[ FIG. 17 ]
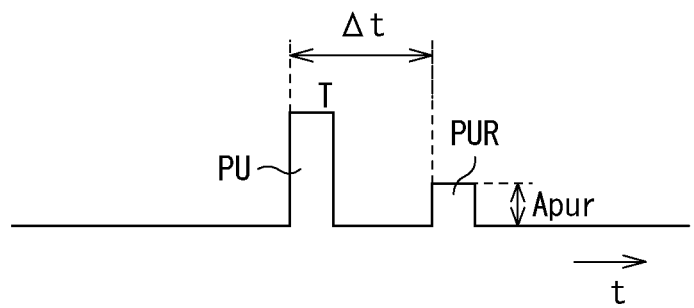

[ FIG. 18 ]
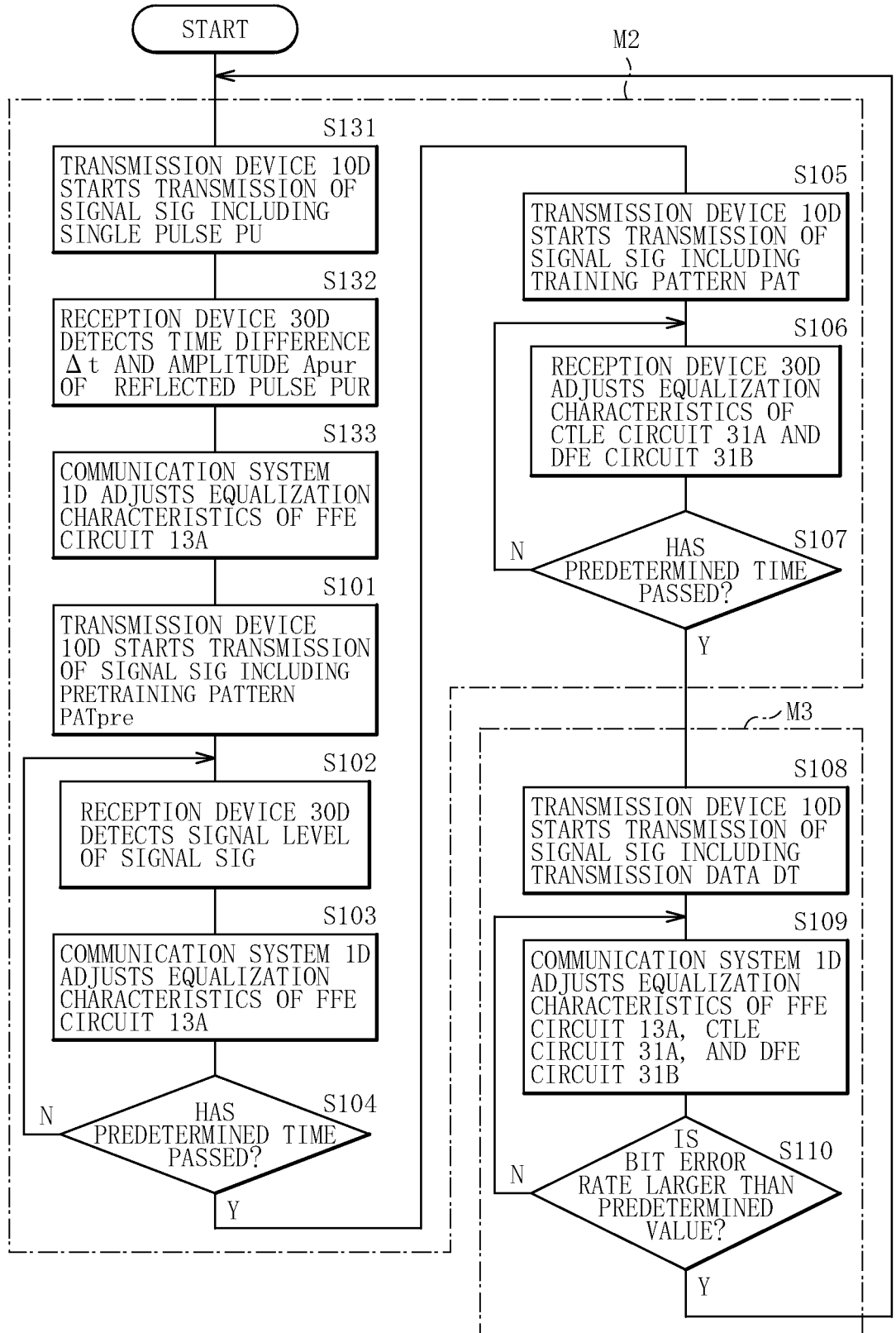

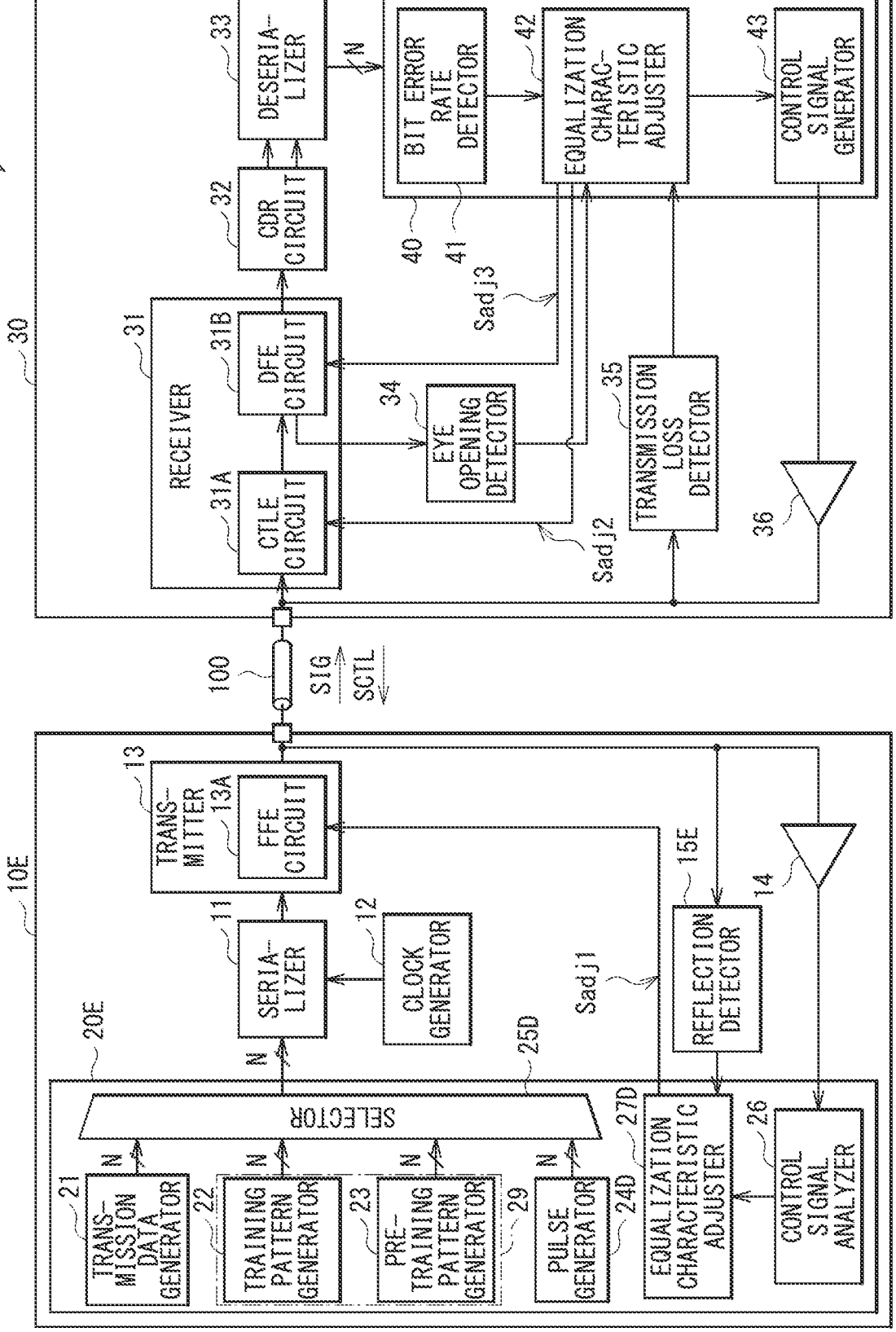
[FIG. 19]

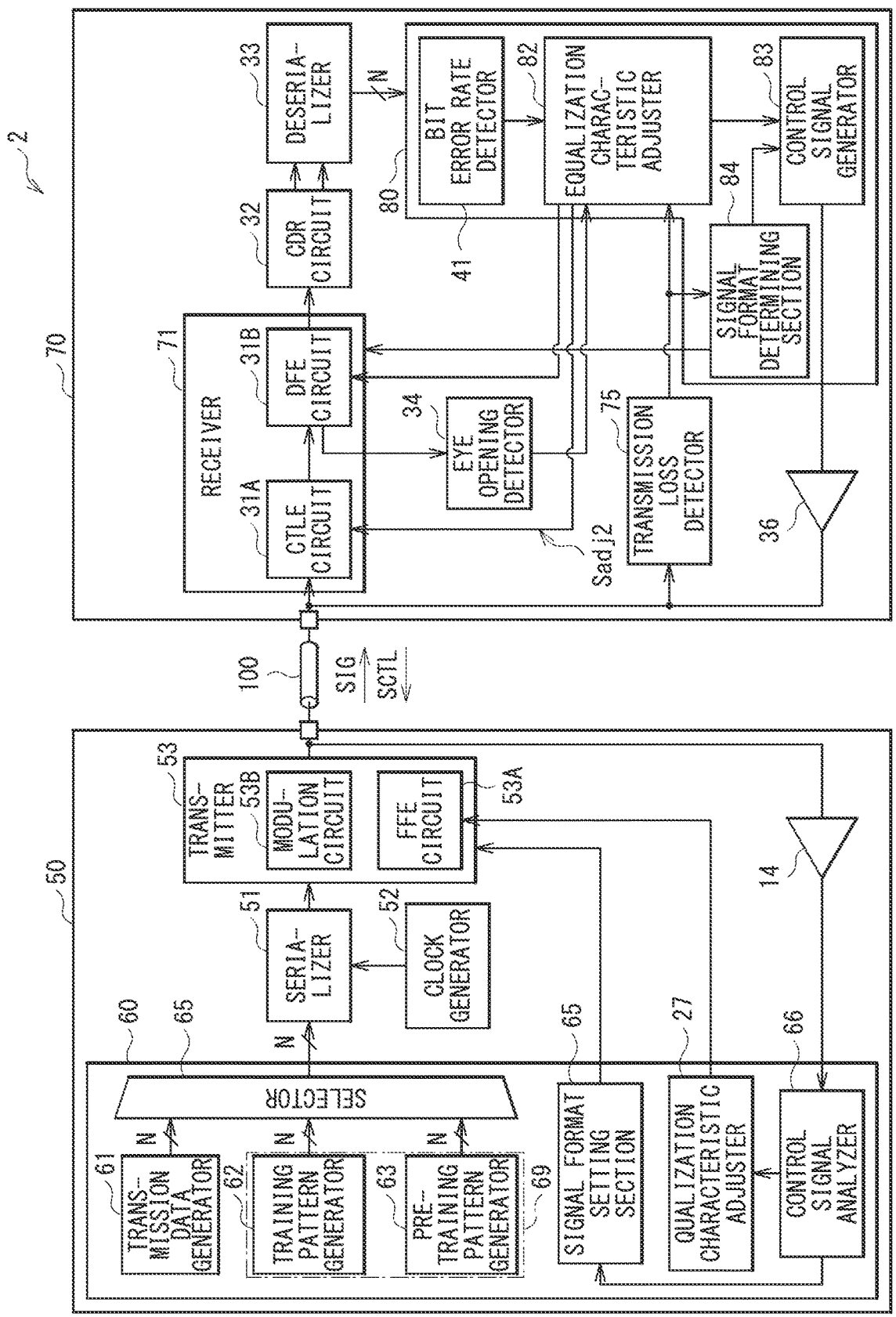
[FIG. 20]

[ FIG. 21 ]
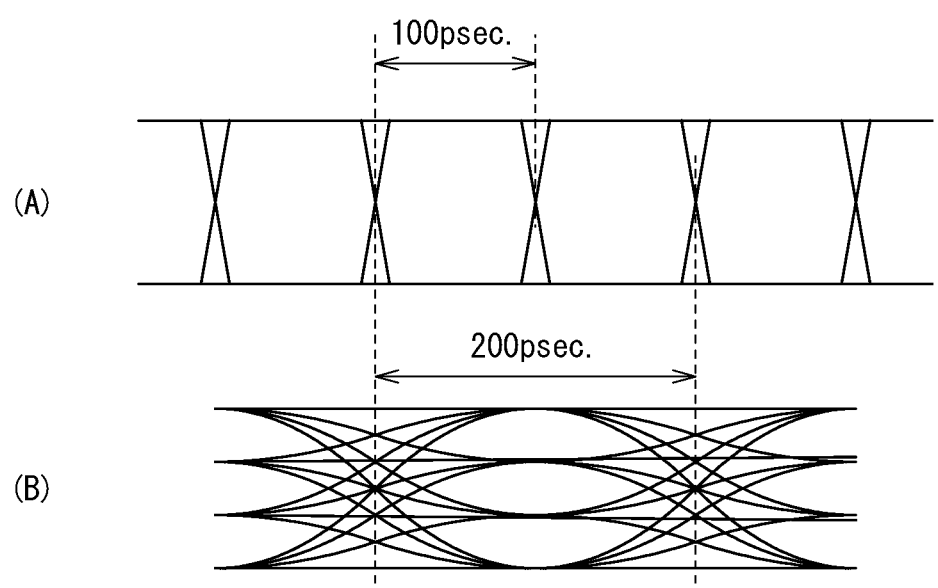

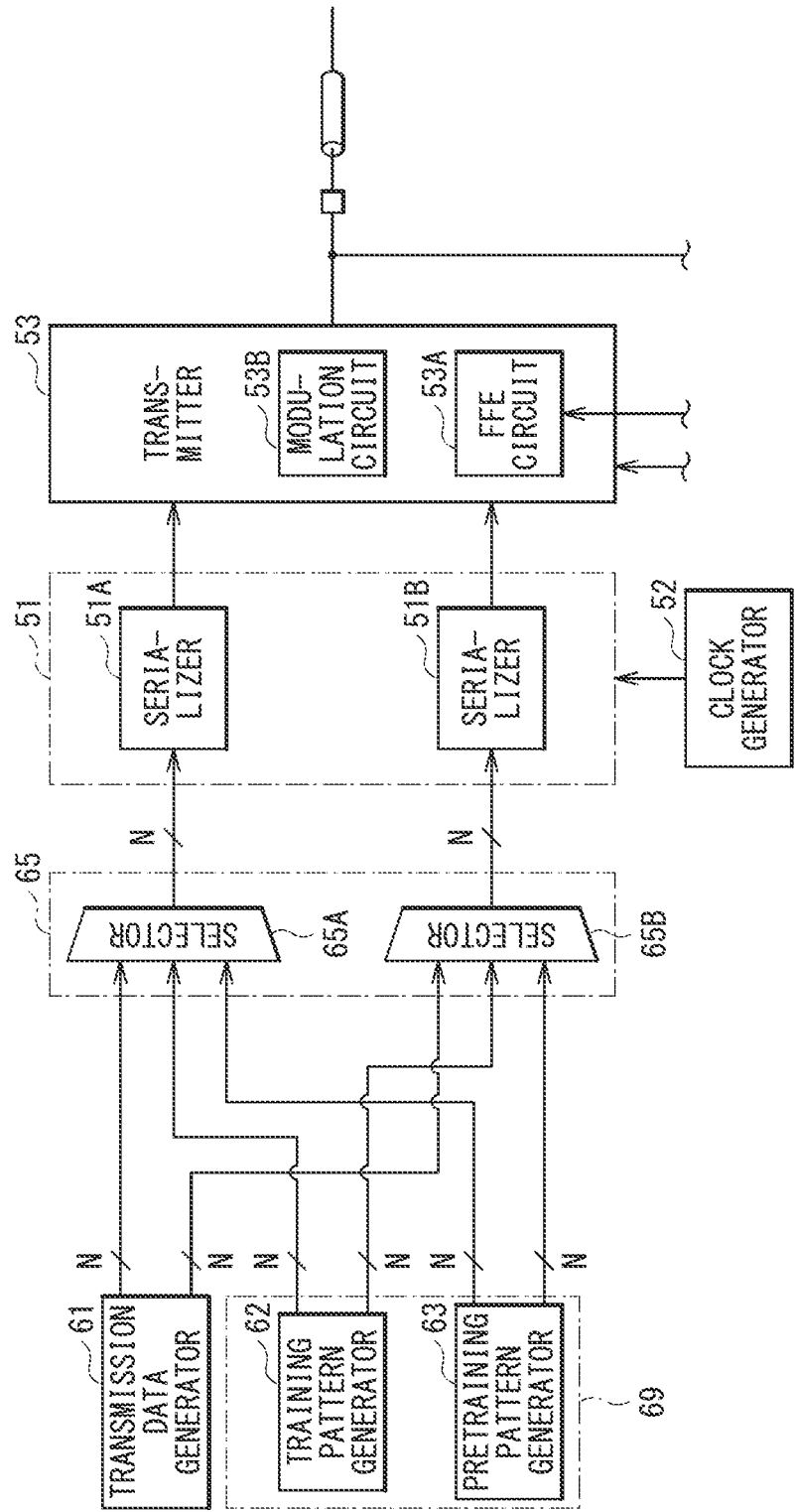
[ FIG. 22 ]

[ FIG. 23 ]
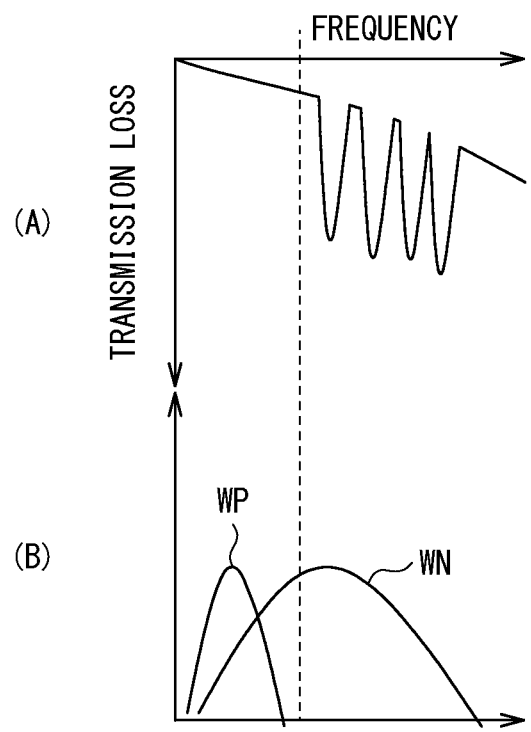
[ FIG. 24 ]
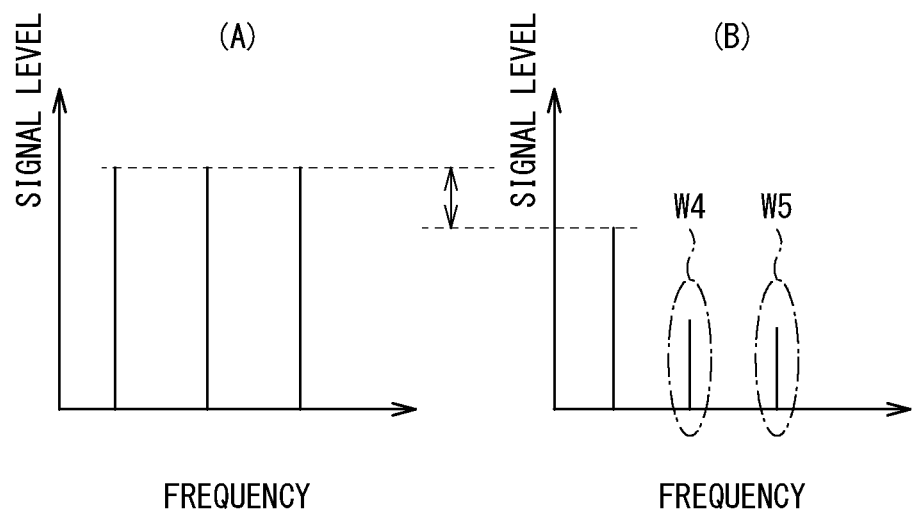

[ FIG. 25 ]
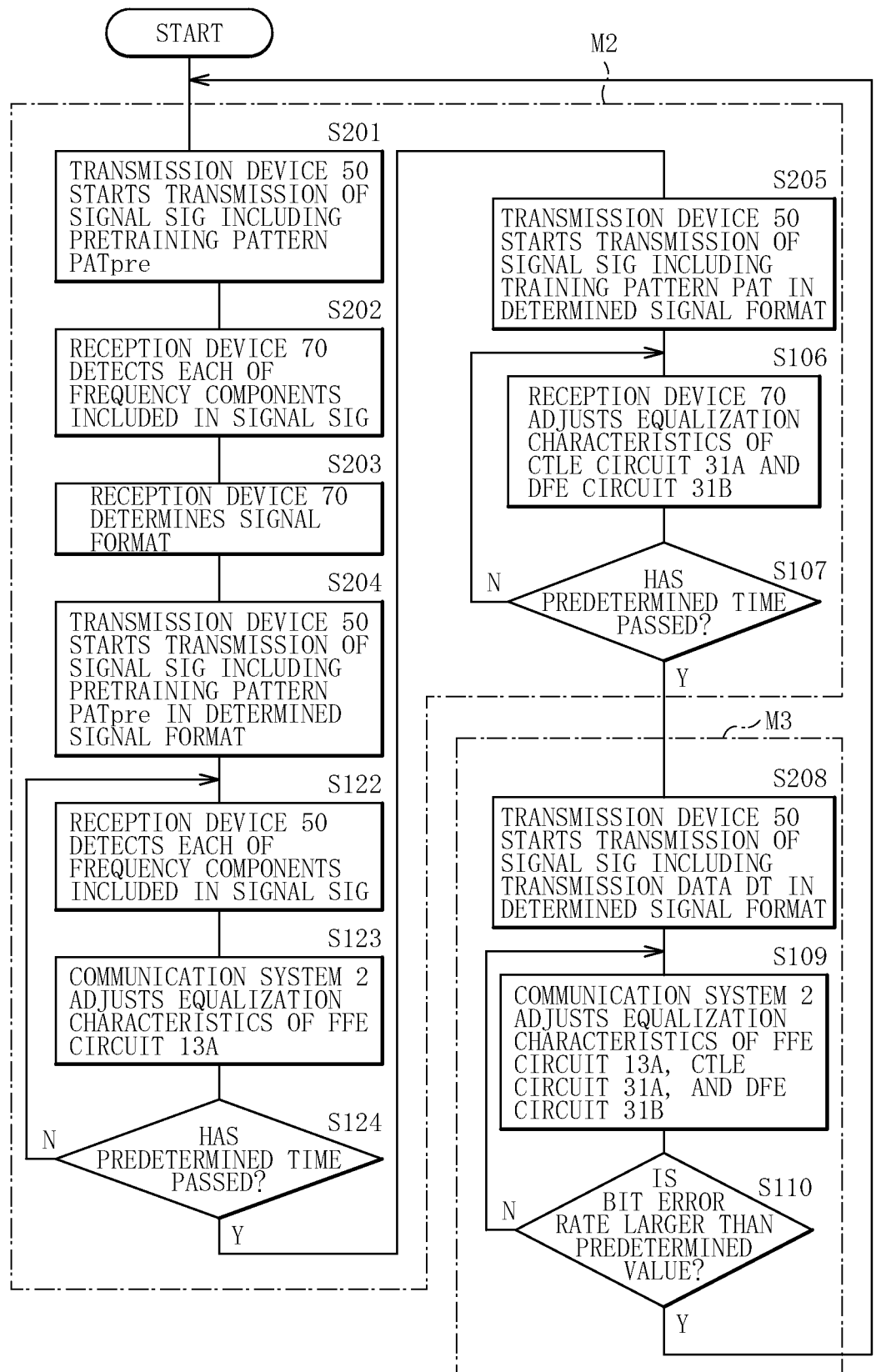

COMMUNICATION SYSTEM, TRANSMISSION DEVICE, AND RECEPTION DEVICE

TECHNICAL FIELD

The present disclosure relates to a communication system, a transmission device, and a reception device that perform communication.

BACKGROUND ART

In a communication system, an equalization circuit is frequently used, for example, in a case where a signal has a high bit rate or in a case where a transmission path is long. For example, PTL 1 discloses a communication system that adjusts a pre-emphasis amount in a pre-emphasis circuit by performing training with use of a pseudo-random pattern.

CITATION LIST

Patent Literature

PTL 1: Japanese Unexamined Patent Application Publication No. 2008-22392

SUMMARY OF THE INVENTION

In a communication system, even in a case where a signal has a high bit rate or in a case where a transmission path is long, high communication quality is desired, and a further improvement in communication quality is expected.

It is desirable to provide a communication system, a transmission device, and a reception device that make it possible to enhance communication quality.

A communication system according to an embodiment of the present disclosure includes a transmission device and a reception device. The transmission device includes a transmission data generator, a pattern generator, a transmitter, and a control signal receiver. The transmission data generator is configured to generate transmission data. The pattern generator is configured to generate an alternate pattern alternating at every lapse of a predetermined time. The transmitter includes a first equalization circuit and is configured to transmit a transmission signal including the transmission data and the alternate pattern. The first equalization circuit is configured to adjust equalization characteristics on the basis of first instruction information. The control signal receiver is configured to receive the first instruction information. The reception device includes a receiver, a first detector, and a control signal transmitter. The receiver is configured to receive the transmission signal. The first detector is configured to detect a frequency component corresponding to the predetermined time of the alternate pattern included in the transmission signal. The control signal transmitter is configured to generate the first instruction information on the basis of a result of detection by the first detector and is configured to transmit the first instruction information.

A transmission device according to an embodiment of the present disclosure includes a transmission data generator, a pattern generator, a transmitter, and a control signal receiver. The transmission data generator is configured to generate transmission data. The pattern generator is configured to generate an alternate pattern alternating at every lapse of a predetermined time. The transmitter includes a first equalization circuit and is configured to transmit a transmission signal including the transmission data and the alternate pattern. The first equalization circuit that is configured to adjust equalization characteristics on the basis of first instruction information. The control signal receiver is configured to receive the first instruction information transmitted from a reception device that is configured to generate the first instruction information on the basis of a frequency component corresponding to the predetermined time of the alternate pattern included in the transmission signal.

A reception device according to an embodiment of the present disclosure includes a receiver, a first detector, and a control signal transmitter. The receiver includes a second equalization circuit and is configured to receive a transmission signal transmitted from a transmission device. The second equalization circuit is configured to adjust equalization characteristics. The transmission device is configured to transmit the transmission signal. The transmission signal includes transmission data and an alternate pattern alternating at every lapse of a predetermined time. The first detector is configured to detect a frequency component corresponding to the predetermined time of the alternate pattern included in the transmission signal. The control signal transmitter is configured to generate first instruction information on the basis of a result of detection by the first detector and is configured to transmit the first instruction information.

In the communication system according to the embodiment of the present disclosure, the transmission signal including the transmission data and the alternate pattern alternating at every lapse of the predetermined time are transmitted from the transmission device, and the transmission signal is received by the reception device. In the reception device, the frequency component corresponding to the predetermined time of the alternate pattern included in the transmission signal is detected, the first instruction information is generated on the basis of a result of such detection, and the first instruction information is transmitted to the transmission device. In the first equalization circuit of the transmission device, equalization characteristics are adjusted on the basis of this first instruction information.

In the transmission device according to the embodiment of the present disclosure, the transmission signal including the transmission data and the alternate pattern alternating at every lapse of the predetermined time are transmitted from the transmitter. Then, the first instruction information transmitted from the reception device that is configured to generate the first instruction information on the basis of the frequency component corresponding to the predetermined time of the alternate pattern included in the transmission signal is received by the control signal receiver. In the first equalization circuit of the transmitter, equalization characteristics are adjusted on the basis of this first instruction information.

In the reception device according to the embodiment of the present disclosure, the transmission signal including the transmission data and the alternate pattern alternating at every lapse of the predetermined time that are transmitted from the transmission signal are received by the receiver. The frequency component corresponding to the predetermined time of the alternate pattern included in the transmission signal is detected by the first detector. The control signal transmitter then generate the first instruction information on the basis of a result of such detection, and transmits this first instruction information to the transmission device.

BRIEF DESCRIPTION OF THE DRAWINGS

FIG. 1 is a block diagram illustrating a configuration example of a communication system according to a first embodiment of the present disclosure.

FIG. 2 is a waveform chart illustrating an example of a pretraining pattern generated by a pretraining pattern generator illustrated in FIG. 1.

FIG. 3 is a characteristic diagram illustrating a characteristic example of a transmission path illustrated in FIG. 1.

FIG. 4 is another characteristic diagram illustrating a characteristic example of the transmission path illustrated in FIG. 1.

FIG. 5 is a state transition diagram of the communication system illustrated in FIG. 1.

FIG. 6 is a flowchart illustrating an operation example of the communication system illustrated in FIG. 1.

FIG. 7 is a block diagram illustrating a configuration example of a communication system according to a modification example of the first embodiment.

FIG. 8 is a block diagram illustrating a configuration example of a communication system according to another modification example of the first embodiment.

FIG. 9 is a flowchart illustrating an operation example of the communication system illustrated in FIG. 8.

FIG. 10 is a waveform chart illustrating an example of a pretraining pattern generated by a pretraining pattern generator according to another modification example of the first embodiment.

FIG. 11 is another characteristic diagram illustrating a characteristic example of a transmission path.

FIG. 12 is a flowchart illustrating an operation example of a communication system according to another modification example of the first embodiment.

FIG. 13 is a waveform chart illustrating an example of a pretraining pattern generated by a pretraining pattern generator according to another modification example of the first embodiment.

FIG. 14 is another characteristic diagram illustrating a characteristic example of the transmission path illustrated in FIG. 1.

FIG. 15 is another characteristic diagram illustrating a characteristic example of the transmission path illustrated in FIG. 1.

FIG. 16 is a block diagram illustrating a configuration example of a communication system according to another modification example of the first embodiment.

FIG. 17 is an explanatory diagram illustrating an example of reflection in the transmission path illustrated in FIG. 1.

FIG. 18 is a flowchart illustrating an operation example of the communication system illustrated in FIG. 16.

FIG. 19 is a block diagram illustrating a configuration example of a communication system according to another modification example of the first embodiment.

FIG. 20 is a block diagram illustrating a configuration example of a communication system according to a second embodiment.

FIG. 21 is an explanatory diagram illustrating an example of a signal to be transmitted and received in the communication system illustrated in FIG. 20.

FIG. 22 is a block diagram illustrating a configuration example of a transmission device illustrated in FIG. 20.

FIG. 23 is another characteristic diagram illustrating a characteristic example of a transmission path illustrated in FIG. 20.

FIG. 24 is another characteristic diagram illustrating a characteristic example of the transmission path illustrated in FIG. 20.

FIG. 25 is a flowchart illustrating an operation example of the communication system illustrated in FIG. 20.

MODES FOR CARRYING OUT THE INVENTION

Some embodiments of the present disclosure are described in detail below with reference to drawings. It is to be noted that description is given in the following order.
1. First Embodiment
2. Second Embodiment 1. First Embodiment Configuration Example FIG. 1 illustrates a configuration example of a communication system (a communication system 1) according to a first embodiment. The communication system 1 is configured to perform communication with use of an NRZ (non-return-to-zero) signal. The communication system 1 includes a transmission device 10 and a reception device 30. The transmission device 10 transmits a signal SIG to the reception device 30 through a transmission path 100. A bit rate of the signal SIG is 10 Gbps in this example. The signal SIG may be a single-ended signal, or a differential signal including two signals that are inverted from each other. In addition, the reception device 30 transmits a control signal SCTL to the transmission device 10 through the transmission path 100. A bit rate of the control signal SCTL is about several Mbps, for example. The control signal SCTL may be a single-ended signal, or a differential signal including two signals that are inverted from each other. Upon transmitting and receiving the signal SIG and the control signal SCTL, the communication system 1 may perform transmission and reception by a full duplex system or may perform transmission and reception by a half duplex system. The communication system 1 includes three equalization circuits (an FFE (Feed Forward Equalizer) circuit 13A, a CTLE (Continuous Time Linear Equalizer) circuit 31A, and a DFE (Decision Feedback Equalizer) circuit 31B that are described later). Accordingly, in the communication system 1, it is possible to enhance communication quality in a case where the transmission device 10 transmits the signal SIG to the reception device 30.

(Transmission Device 10)

The transmission device 10 includes a processor 20, a serializer 11, a clock generator 12, a transmitter 13, and a receiver 14.

The processor 20 is configured to perform predetermined processing. The processor 20 includes a transmission data generator 21, a training pattern generator 22, a pretraining pattern generator 23, a selector 25, a control signal analyzer 26, and a equalization characteristic adjuster 27. The training pattern generator 22 and the pretraining pattern generator 23 are included in a pattern generator 29.

The transmission data generator 21 is configured to generate transmission data DT including information to be transmitted from the transmission device 10 to the reception device 30. The transmission data generator 21 then supplies the generated transmission data DT to the selector 25 with use of an N-bit parallel signal.

The training pattern generator 22 is configured to generate a training pattern PAT to be used in adjusting equalization characteristics of three equalization circuits (the FFE circuit 13A, the CTLE circuit 31A, and the DFE circuit 31B) in the communication system 1. Examples of the training pattern PAT include a pseudo-random pattern such as a PRBS (Pseudo Random Bit Sequence) pattern. The pseudo-random pattern is generated by serializing, by the serializer 11, the training pattern PAT generated by the training pattern generator 22. The training pattern generator 22 then supplies the generated training pattern PAT to the selector 25 with use of an N-bit parallel signal.

The pretraining pattern generator 23 is configured to generate a pretraining pattern PATpre.

FIG. 2 illustrates an example of the pretraining pattern PATpre. The pretraining pattern PATpre is an alternate pattern in which "1" and "0" alternate at every lapse of a predetermined time T, and is, for example, a pattern having a pulse frequency of 5 GHz. The alternate pattern is generated by serializing, by the serializer 11, the pretraining pattern PATpre generated by the pretraining pattern generator 23. The pretraining pattern generator 23 then supplies the generated pretraining pattern PATpre to the selector 25 with use of an N-bit parallel signal.

The selector 25 is configured to select one of an output signal of the transmission data generator 21, an output signal of the training pattern generator 22, and an output signal of the pretraining pattern generator 23. The selector 25 then supplies the selected signal to the serializer 11 with use of an N-bit parallel signal.

The control signal analyzer 26 is configured to analyze control information included in the control signal SCTL on the basis of the control signal SCTL received by the receiver 14.

In a case where the control signal SCTL includes instruction information about equalization characteristics of the FFE circuit 13A (to be described later), the equalization characteristic adjuster 27 is configured to adjust the equalization characteristics of the FFE circuit 13A on the basis of the instruction information. Examples of the instruction information include an instruction to increase an amplitude in a high-frequency region and an instruction to decrease the amplitude in the high-frequency region in a case where the FFE circuit 13A is a pre-emphasis circuit. The equalization characteristic adjuster 27 generates a control signal Sadj1 that indicates an equalization parameter of the FFE circuit 13A on the basis of this instruction information, and supplies this control signal Sadj1 to the FFE circuit 13A, thereby adjusting the equalization characteristics of the FFE circuit 13A.

The serializer 11 is configured to generate a data signal that is a serial signal on the basis of the N-bit parallel signal supplied from the selector 25 of the processor 20 and a clock signal supplied from the clock generator 12.

The clock generator 12 includes, for example, a PLL (Phase Locked Loop), and is configured to generate a clock signal. In this example, the clock generator 12 generates a clock signal having a clock frequency of 10 GHz. It is to be noted that, for example, in a case where the serializer 11 is configured using a half rate architecture, the clock frequency may be 5 GHz.

The transmitter 13 is configured to generate the signal SIG on the basis of the data signal supplied from the serializer 11 and transmit the generated signal SIG to the reception device 30. The transmitter 13 includes the FFE circuit 13A. Examples of the FFE circuit 13A include an equalization circuit such as a pre-emphasis circuit and a deemphasis circuit, and is configured to have variable equalization characteristics. The FFE circuit 13A sets the equalization characteristics on the basis of the equalization parameter indicated by the control signal Sadj1 supplied from the equalization characteristic adjuster 27. The equalization parameter includes, for example, information about tap coefficients in a plurality of taps of the FFE circuit 13A.

The receiver 14 is configured to receive the control signal SCTL transmitted from the reception device 30. The receiver 14 then supplies a control signal corresponding to the received control signal SCTL to the control signal analyzer 26 of the processor 20.

(Reception Device 30)

The reception device 30 includes a receiver 31, a CDR (Clock and Data Recovery) circuit 32, a deserializer 33, and an eye opening detector 34, a transmission loss detector 35, a transmitter 36, and a processor 40.

The receiver 31 is configured to receive the signal SIG transmitted from the transmission device 10. The receiver 31 includes a CTLE circuit 31A and a DFE circuit 31B.

The CTLE circuit 31A is a linear equalization circuit of a continuous-time type, and is configured to have variable equalization characteristics. The CTLE circuit 31A is disposed in a stage preceding the DFE circuit 31B in the receiver 31. The CTLE circuit 31A sets the equalization characteristics on the basis of an equalization parameter indicated by a control signal Sadj2 supplied from an equalization characteristic adjuster 42 (to be described later) of the processor 40.

The DFE circuit 31B is an equalization circuit of a decision feedback type, and is configured to have variable equalization characteristics. Specifically, the DFE circuit 31B is configured to delay a signal decided in the DFE circuit 31B, weight the delayed signal by an equalization parameter (a tap coefficient), add the weighted signal and a signal inputted into the DFE circuit 31B to each other, and decide an added signal (an addition signal). In addition, the DFE circuit 31B is configured to supply this addition signal to the eye opening detector 34. The DFE circuit 31B is disposed in a stage following the CTLE circuit 31A in the receiver 31. The DFE circuit 31B sets equalization characteristics on the basis of a equalization parameter indicated by a control signal Sadj3 supplied from the equalization characteristic adjuster 42 (to be described later) of the processor 40.

The CDR circuit 32 is configured to regenerate a clock signal and generate a data signal on the basis of a signal supplied from the receiver 31.

The deserializer 33 is configured to generate a data signal that is an N-bit parallel signal by deserializing the data signal on the basis of the clock signal and the data signal supplied from the CDR circuit 32. The deserializer 33 then supplies the generated data signal to the processor 40.

The eye opening detector 34 is configured to detect a size of an eye opening of the addition signal in the DFE circuit 31B. The addition signal is a signal obtained by adding the weighted signal and the signal inputted into the DFE circuit 31B to each other in the DFE circuit 31B, as described above. Accordingly, this addition signal reflects equalization characteristics of the DFE circuit 31B in addition to the equalization characteristics of the FFE circuit 13A and the equalization characteristics of the CTLE circuit 31A. The eye opening detector 34 detects the size of eye opening of such an addition signal, and supplies a result of such detection to the processor 40.

In a case where the transmission device 10 transmits the signal SIG including the pretraining pattern PATpre (FIG. 2), the transmission loss detector 35 is configured to detect a signal level of this signal SIG. The transmission loss detector 35 is configured with use of an AD (Analog to Digital) conversion circuit or an amplitude detection circuit, for example.

FIG. 3 schematically illustrates a characteristic example of the transmission path 100. A horizontal axis indicates frequency, and a vertical axis indicates transmission loss in the transmission path 100. A characteristic W1 indicates a case where the transmission path 100 is short, and a characteristic W2 indicates a case where the transmission path 100 is long. The higher the frequency is, and the longer the transmission path 100 is, the more the transmission loss is increased.

(A) of FIG. 4 indicates a signal level of the signal SIG at an output terminal of the transmission device 10, and (B) of FIG. 4 indicates a signal level of the signal SIG at an input terminal of the reception device 30. The signal SIG includes the pretraining pattern PATpre (FIG. 2), and therefore includes a frequency component of 5 GHz in this example. The signal level of the signal SIG is attenuated by the transmission path 100. The transmission loss detector 35 detects the signal level (the frequency component of 5 GHz illustrated in FIG. 4B) of the signal SIG attenuated by the transmission path 100. This allows the transmission loss detector 35 to detect transmission loss at 5 GHz in this example. The transmission loss detector 35 then supplies a result of detection to the processor 40.

The transmitter 36 is configured to transmit a control signal supplied from the processor 40 to the transmission device 10 with use of the control signal SCTL.

The processor 40 is configured to perform predetermined processing. The processor 40 includes a bit error rate detector 41, the equalization characteristic adjuster 42, and a control signal generator 43.

The bit error rate detector 41 is configured to detect a bit error rate on the basis of the data signal supplied from the deserializer 33. The bit error rate detector 41 then supplies a result of such detection to the equalization characteristic adjuster 42.

The equalization characteristic adjuster 42 is configured to adjust the equalization characteristics of the CTLE circuit 31A and the DFE circuit 31B on the basis of the result of detection by the eye opening detector 34, and generate instruction information about the equalization characteristics of the FFE circuit 13A in the transmission device 10. Specifically, the equalization characteristic adjuster 42 generates the control signal Sadj2 indicating the equalization parameter of the CTLE circuit 31A, and generates the control signal Sadj3 indicating the equalization parameter of the DFE circuit 31B. The equalization characteristic adjuster 42 then supplies the control signal Sadj2 to the CTLE circuit 31A to adjust the equalization characteristics of the CTLE circuit 31A, and supplies the control signal Sadj3 to the DFE circuit 31B to adjust the equalization characteristics of the DFE circuit 31B. In addition, the equalization characteristic adjuster 42 also has a function of generating instruction information about the equalization characteristics of the FFE circuit 13A in the transmission device 10 on the basis of the result of detection by the transmission loss detector 35.

The control signal generator 43 is configured to generate control information to be transmitted to the transmission device 10 and supply a control signal including the generated control information to the transmitter 36. For example, in a case where instruction information about the equalization characteristics of the FFE circuit 13A is supplied from the equalization characteristic adjuster 42, the control signal generator 43 generates a control including this instruction information.

The transmitter 36 is configured to generate the control signal SCTL on the basis of the control signal supplied from the control signal generator 43 and transmit the generated control signal SCTL to the transmission device 10.

With this configuration, in the communication system 1, the transmission device 10 first transmits the signal SIG including the pretraining pattern PATpre (FIG. 2), and the transmission loss detector 35 of the reception device 30 detects the signal level of the signal SIG, thereby detecting transmission loss in the transmission path 100. The communication system 1 adjusts the equalization characteristics of the FFE circuit 13A on the basis of a result of such detection. Next, the transmission device 10 then transmits the signal SIG including the training pattern PAT, and the eye opening detector 34 of the reception device 30 detects a size of an eye opening. The communication system 1 adjusts the equalization characteristics of the CTLE circuit 31A and the equalization characteristics of the DFE circuit 31B on the basis of a result of such detection.

Here, the transmission data generator 21 corresponds to a specific example of a "transmission data generator" in the present disclosure. The pattern generator 29 corresponds to a specific example of a "pattern generator" in the present disclosure. The pretraining pattern PATpre corresponds to a specific example of an "alternate pattern" in the present disclosure. The transmitter 13 corresponds to a specific example of a "transmitter" in the present disclosure. The FFE circuit 13A corresponds to a specific example of a "first equalization circuit" in the present disclosure. The receiver 14 and the control signal analyzer 26 corresponds to specific examples of a "control signal receiver" in the present disclosure.

The receiver 31 corresponds to a specific example of a "receiver" in the present disclosure. The DFE circuit 31B corresponds to a specific example of a "second equalization circuit" in the present disclosure. The CTLE circuit 31A corresponds to a specific example of a "third equalization circuit" in the present disclosure. The transmission loss detector 35 corresponds to a specific example of a "first detector" in the present disclosure. The control signal generator 43 and the transmitter 36 correspond to specific examples of a "control signal transmitter" in the present disclosure. The eye opening detector 34 corresponds to a specific example of a "waveform detector" in the present disclosure.

[Operation and Workings]

Description is given next of an operation and workings of the communication systems 1 according to the present embodiment.

(Overview of Overall Operation)

First, an overview of an overall operation of the communication system 1 is described with reference to FIG. 1.

In the transmission device 10, the transmission data generator 21 generates the transmission data DT including information to be transmitted from the transmission device 10 to the reception device 30. The training pattern generator 22 generates the training pattern PAT. The pretraining pattern generator 23 generates the pretraining pattern PATpre. The selector 25 selects one of the output signal of the transmission data generator 21, the output signal of the training pattern generator 22, and the output signal of the pretraining pattern generator 23. The serializer 11 generates a data signal that is a serial signal on the basis of an N-bit parallel signal selected by the selector 25 and a clock signal supplied from the clock generator 12. The transmitter 13 generates the signal SIG on the basis of the data signal supplied from the serializer 11, and transmits the generated signal SIG to the reception device 30. The FFE circuit 13A of the transmitter 13 sets the equalization characteristics on the basis of the equalization parameter indicated by the control signal Sadj1.

In the reception device 30, the receiver 31 receives the signal SIG transmitted from the transmission device 10. The CTLE circuit 31A of the receiver 31 sets the equalization characteristics on the basis of the equalization parameter indicated by the control signal Sadj2. The DFE circuit 31B sets the equalization characteristics on the basis of the equalization parameter indicated by the control signal Sadj3. The CDR circuit 32 regenerates a clock signal and generate a data signal on the basis of a signal supplied from the receiver 31. The deserializer 33 deserializes the data signal on the basis of the clock signal and the data signal supplied from the CDR circuit 32 to generate a data signal that is a parallel signal. The eye opening detector 34 detects the size of the eye opening of the addition signal in the DFE circuit 31B. In a case where the transmission device 10 transmits the signal SIG including the pretraining pattern PATpre, the transmission loss detector 35 detects the signal level of this signal SIG. The bit error rate detector 41 detects a bit error rate on the basis of the data signal supplied from the deserializer 33. The equalization characteristic adjuster 42 adjusts the equalization characteristics of the CTLE circuit 31A and the DFE circuit 31B on the basis of a result of detection by the eye opening detector 34, and generates instruction information about the equalization characteristics of the FFE circuit 13A in the transmission device 10. In addition, the equalization characteristic adjuster 42 generates instruction information about the equalization characteristics of the FFE circuit 13A of the transmission device 10 on the basis of a result of detection by the transmission loss detector 35.

The control signal generator 43 of the reception device 30 generates control information to be transmitted to the transmission device 10, and supplies a control signal including the generated information to the transmitter 36. In particular, for example, in a case where instruction information about the equalization characteristics of the FFE circuit 13A is supplied from the equalization characteristic adjuster 42, the control signal generator 43 generates a control signal including this instruction information. The transmitter 36 generates the control signal SCTL on the basis of the control signal supplied from the control signal generator 43, and transmits the generated control signal SCTL to the transmission device 10.

The receiver 14 of the transmission device 10 receives the control signal SCTL transmitted from the reception device 30. The control signal analyzer 26 analyzes control information included in the control signal SCTL on the basis of the control signal SCTL received by the receiver 14. In a case where the control signal SCTL includes instruction information about the equalization characteristics of the FFE circuit 13A, the equalization characteristic adjuster 27 adjusts the equalization characteristics of the FFE circuit 13A on the basis of this instruction information.

(Detailed Operation)

FIG. 5 illustrates an example of operation modes of the communication system 1. The communication system 1 has a plurality of operation modes M. The plurality of operation modes M includes a shutdown mode M1, a startup mode M2, a normal mode M3, and a sleep mode M4.

For example, upon turning on power, the communication system 1 sets the operation mode M to the shutdown mode M1. Thereafter, upon releasing reset, the operation mode M is then shifted from the shutdown mode M1 to the startup mode M2. In the startup mode M2, the communication system 1 performs various kinds of processing for establishing a link. Various kinds of processing for establishing a link include adjustment of the equalization characteristics of the FFE circuit 13A, the equalization characteristics of the CTLE circuit 31A, and the equalization characteristics of the DFE circuit 31B. Upon establishing the link, the operation mode M is then shifted from the startup mode M2 to the normal mode M3. In this normal mode M3, the transmission device 10 and the reception device 30 perform communication. In a case where a sleep command is supplied to the communication system 1, the operation mode M is shifted from the normal mode M3 to the sleep mode M4. In this sleep mode M4, the transmission device 10 and the reception device 30 stop communication. At this time, various kinds of setting such as equalization parameters of the transmission device 10 and the reception device 30 are maintained. Upon releasing sleep, the operation mode is then shifted from the sleep mode M3 to the startup mode M2, and upon establishing a link in the startup mode M2, the operation mode M is shifted to the normal mode M3. In addition, in a case where a reset signal is supplied to the communication system 1 in the normal mode M3 and the sleep mode M4, the operation mode is shifted to the shutdown mode M1.

FIG. 6 illustrates an example of an operation of adjusting equalization characteristics in the communication system 1.

In a case where the operation mode M of the communication system 1 is shifted to the startup mode M2, the transmission device 10 first starts transmission of the signal SIG including the pretraining pattern PATpre that is an alternate pattern (step S101). Specifically, the pretraining pattern generator 23 generates the pretraining pattern PATpre, the selector 25 selects the output signal of the pretraining pattern generator 23, and the serializer 11 serializes the signal selected by the selector 25. The transmitter 13 then generates the signal SIG including the pretraining pattern PATpre on the basis of the serialized signal, and transmits this signal SIG. The reception device 30 receives this signal SIG.

Next, the transmission loss detector 35 of the reception device 30 detects the signal level of the signal SIG (step S102).

Next, the communication system 1 adjusts the equalization characteristics of the FFE circuit 13A (step S103). Specifically, the equalization characteristic adjuster 42 generates instruction information about the equalization characteristics of the FFE circuit 13A of the transmission device 10 on the basis of a result of detection by the transmission loss detector 35. For example, in a case where the signal level of the signal SIG detected in the step S102 is small, instruction information that an amplitude in a high-frequency region is to be increased. The control signal generator 43 supplies a control signal including this instruction information to the transmitter 36, and the transmitter 36 generates the control signal SCTL on the basis of this control signal, and transmits the generated control signal SCTL to the transmission device 10. The receiver 14 of the transmission device 10 receives the control signal SCTL, and the control signal analyzer 26 analyzes control information including this control signal SCTL. The equalization characteristic adjuster 27 then adjusts the equalization characteristics of the FFE circuit 13A on the basis of instruction information about the equalization characteristics of the FFE circuit 13A included in the control signal SCTL.

Next, the processor 20 of the transmission device 10 confirms whether or not a predetermined time has passed since start of transmission of the signal SIG including the pretraining pattern PATpre in the step S101 (step S104). In a case where the predetermined time has not passed yet ("N" in the step S104), processing returns to the step S102, and operations in the steps S102 to S104 are repeated until the predetermined time has passed. That is, the "predetermined time" is set to a time in which the equalization characteristics of the FFE circuit 13A are expected to be converged by the operations in the steps S102 to S104. It is to be noted that in this example, the processor 20 of the transmission device 10 confirms whether or not the predetermined time has passed, but this is not limitative. For example, the processor 40 of the reception device 30 may confirm whether or not the predetermined time has passed, and may notify the transmission device 10 in a case where the predetermined time has passed.

In the step S104, in a case where the predetermined time has passed ("Y" in the step S104), the transmission device 10 starts transmission of the signal SIG including the training pattern PAT that is a pseudo-random pattern (step S105). Specifically, the training pattern generator 22 generates the training pattern PAT, the selector 25 selects the output signal of the training pattern generator 22, and the serializer 11 serializes the signal selected by the selector 25. The transmitter 13 then generates the signal SIG including the training pattern PAT on the basis of the serialized signal, and transmits this signal SIG. The reception device 30 receives this signal SIG.

Next, the reception device 30 adjusts the equalization characteristics of the CTLE circuit 31A and the DFE circuit 31B (step S106). Specifically, the eye opening detector 34 of the reception device 30 detects the size of the eye opening of the addition signal in the DFE circuit 31B. The equalization characteristic adjuster 42 then adjusts the equalization characteristics of the CTLE circuit 31A and the DFE circuit 31B on the basis of a result of detection by the eye opening detector 34.

Next, the reception device 30 confirms whether or not a predetermined time has passed since start of transmission of the signal SIG including the pretraining pattern PATpre by the transmission device 10 in the step S106 (step S107). In a case where the predetermined time has not passed yet ("N" in the step S107), the processing returns to the step S106, and the operations in the steps S106 and S107 are repeated until the predetermined time has passed. That is, the "predetermined time" is set to a time in which the equalization characteristics of the CTLE circuit 31A and the DFE circuit 31B are expected to be converted by the operations in the step S106 and S107.

In the step S107, in a case where the predetermined time has passed ("Y" in the step S107), the operation mode M of the communication system 1 is shifted from the startup mode M2 to the normal mode M3, and the transmission device 10 starts transmission of the signal SIG including the transmission data DT (step S108). Specifically, the transmission data generator 21 generates the transmission data DT, the selector 25 selects the output signal of the transmission data generator 21, and the serializer 11 serializes the signal selected by the selector 25. The transmitter 13 then generates the signal SIG including the transmission data DT on the basis of the serialized signal, and transmits this signal SIG. The reception device 30 receives the signal SIG.

Next, the communication system 1 adjusts the equalization characteristics of the FFE circuit 13A, the CTLE circuit 31A, and the DFE circuit 31B (step S109). Specifically, the eye opening detector 34 of the reception device 30 detects the size of the eye opening of the addition signal in the DFE circuit 31B. The equalization characteristic adjuster 42 then adjusts the equalization characteristics of the CTLE circuit 31A and the DFE circuit 31B on the basis of a result of detection by the eye opening detector 34. In addition, the equalization characteristic adjuster 42 generates instruction information about the equalization characteristics of the FFE circuit 13A of the transmission device 10 on the basis of the result of detection by the eye opening detector 34. The control signal generator 43 supplies a control signal including this instruction information to the transmitter 36, and the transmitter 36 generates the control signal SCTRL on the basis of this control signal, and transmits the generated control signal SCTL to the transmission device 10. The receiver 14 of the transmission device 10 receives the control signal SCTL, and the equalization characteristic adjuster 27 adjusts the equalization characteristics of the FFE circuit 13A on the basis of the instruction information about the equalization characteristics of the FFE circuit 13A included in the control signal SCTL. The operation of adjusting the equalization characteristics of the FFE circuit 13A, the CTLE circuit 31A, and the DFE circuit 31B by the communication system 1 may be performed continuously or intermittently.

Next, the bit error rate detector 41 detects a bit error rate on the basis of a data signal supplied from the deserializer 33, and confirms whether or not the detected bit error rate is larger than a predetermined value (step S110). In a case where the bit error rate is equal to or lower than the predetermined value ("N" in the step S110), the processing returns to the step S109, and the operations in the steps S109 and S110 are repeated.

In the step S110, in a case where the detected bit error rate is larger than the predetermined value ("Y" in the step S110), the operation mode M is shifted from the normal mode M3 to the startup mode M2, and the processing returns to the step S101.

As described above, in the communication system 1, before transmission of the signal SIG including the transmission data DT, the transmission device 10 first transmits the signal SIG including the pretraining pattern PATpre, the reception device 30 detects the signal level of the signal SIG, and the communication system 1 adjusts the equalization characteristics of the FFE circuit 13A on the basis of a result of such detection. Thereafter, the transmission device 10 then transmits the signal SIG including the training pattern PAT, the reception device 30 detects a size of an eye opening of a signal inputted into the DFE circuit 31B, and the communication system 1 adjusts the equalization characteristics of the CTLE circuit 31A and the DFE circuit 31B on the basis of a result of such detection. This allows the communication system 1 to appropriately adjust the equalization characteristics of the FFE circuit 13A, the CTLE circuit 31A, and the DFE circuit 31B, which consequently makes it possible to enhance communication quality.

That is, for example, in a case where the operations in the steps S101 to S104 in FIG. 6 are omitted, and the equalization characteristics of the CTLE circuit 31A and the DFE circuit 31B are adjusted on the basis of the training pattern PAT, appropriate equalization characteristics may not be obtained. The reason for this is that the DFE circuit 31B provided in the reception device 30 is a equalization circuit of the decision feedback type, and in a case where the eye of the addition signal in the DFE circuit 31B is not sufficiently open, it is not possible to properly perform determination on the basis of this addition signal, which does not make it possible to obtain appropriate equalization characteristics. In particular, in a case where the transmission path 100 is long, the eye of the addition signal in the DFE circuit 31B may not be sufficiently open, and in this case, the equalization characteristics of the DFE circuit 31B are not appropriately adjusted. As a result, communication quality of the communication system 1 may be decreased.

In contrast, the communication system 1 first adjusts the equalization characteristics of the FFE circuit 13A on the basis of the pretraining pattern PATpre by performing the operations in the steps S101 to S104. After adjusting the equalization characteristics of the FFE circuit 13A of the transmission device 10, the communication system 1 then adjusts the equalization characteristics of the CTLE circuit 31A and the DFE circuit 31B in the reception device 30 on the basis of the training pattern PAT by performing the operations in the step S105 to S107. Thus, the communication system 1 adjusts the equalization characteristics of the CTLE circuit 31A and the DFE circuit 31B in the reception device 30 after adjusting the equalization characteristics of the FFE circuit 13A in the transmission device 10, which makes it possible to increase the eye opening of the addition signal in the DFE circuit 31B in adjusting the equalization characteristics of the DFE circuit 31B. This allows the DFE circuit 31B to perform a proper feedback operation and obtain appropriate equalization characteristics. This consequently makes it possible to enhance communication quality of the communication system 1.

In addition, the communication system 1 adjusts the equalization characteristics of the FFE circuit 13A in the transmission device 10 on the basis of pretraining pattern PATpre that is an alternate pattern, which makes it possible to simplify a circuit configuration. That is, for example, in a case where the equalization characteristics of the FFE circuit 13A are adjusted on the basis of the training pattern PAT that is a pseudo-random pattern, the signal SIG has various frequency components, and it is therefore necessary to configure the transmission loss detector 35 to extract only a specific frequency component included in the signal SIG. In this case, the circuit configuration of the transmission loss detector 35 may be complicated. In contrast, the communication system 1 adjusts the equalization characteristics of the FFE circuit 13A on the basis of the pretraining pattern PATpre that is an alternate pattern; therefore, it is only necessary for the transmission loss detector 35 to obtain, for example, the amplitude of the signal SIG, which makes it possible to simplify the circuit configuration of the transmission loss detector 35.

[Effects]

As described above, in the present embodiment, before transmission of a signal including transmission data, the transmission device transmits a signal including a pretraining pattern, the reception device detects a signal level of the signal, and the communication system adjusts equalization characteristics of the FFE circuit on the basis of a result of such detection, which makes it possible to enhance communication quality.

In the present embodiment, the equalization characteristics of the FFE circuit in the transmission device are adjusted on the basis of the pretraining pattern that is an alternate pattern, which makes it possible to simplify the circuit configuration.

Modification Example 1-1

In the above-described embodiment, the transmission loss detector 35 detects the signal level of the signal SIG, but this is not limitative. Alternatively, for example, like a communication system 1A illustrated in FIG. 7, a transmission loss detector may detect a signal level of a signal inputted into the DFE circuit 31B. The communication system 1A includes a reception device 30A. The reception device 30A includes a transmission loss detector 35B. The transmission loss detector 35B is configured to detect a signal level of a signal inputted into the DFE circuit 31B in a case where the transmission device 10 transmits the signal SIG including the pretraining pattern PATpre.

Modification Example 1-2

In the above-described embodiment, the transmission device 10 transmits the signal SIG including the training pattern that is a pseudo-random pattern, but this is not limitative. Alternatively, for example, like a communication system 1B illustrated in FIG. 8, a transmission device may not transmit the signal SIG including the training pattern that is a pseudo-random pattern. The communication system 1B includes a transmission device 10B. The transmission device 10B includes a processor 20B. The processor 20B includes a selector 25B. The selector 25B is configured to select one of the output signal of the transmission data generator 21 and the output signal of the pretraining pattern generator 23. That is, the processor 20B corresponds to the processor 20 (FIG. 1) according to the above-described embodiment from which the training pattern generator 22 is omitted. In this case, the communication system 1B adjusts the equalization characteristics of the CTLE circuit 31A and the DFE circuit 31B on the basis of the signal SIG including the transmission data DT as illustrated in steps S115, S106, and S107 in FIG. 9. Specifically, the transmission device 10A starts transmission of the signal SIG including the transmission data DT (the step S115), and the reception device 30 adjusts the equalization characteristics of the CTLE circuit 31A and the DFE circuit 31B (the step S106). Then, these operations are repeated until a predetermined time has passed since start of transmission of the signal SIG including the transmission data DT by the transmission device 10A in step S116 (the step S107). In a case where the predetermined time has passed ("Y" in the step S107), the operation mode M of the communication system 1B is shifted from the startup mode M2 to the normal mode M3, and the communication system 1B adjusts the equalization characteristics of the FFE circuit 13A, the CTLE circuit 31A, and the DFE circuit 31B (step S109).

Modification Example 1-3

The above-described embodiment uses the pretraining pattern PATpre that is an alternate pattern in which "1" and "0" alternate at every lapse of the predetermined time T; however, the time length of the predetermined time T may be configured to be variable. A communication system 1C according to the present modification example is described in detail below.

As with the communication system 1 (FIG. 1) according to the above-described embodiment, the communication system 1C includes a transmission device 10C and a reception device 30C.

The transmission device 10C includes a pretraining pattern generator 23C. The pretraining pattern generator 23C is configured to generate the pretraining pattern PATpre.

FIG. 10 illustrates an example of the pretraining pattern PATpre generated by the pretraining pattern generator 23C. The pretraining pattern PATpre is an alternate pattern in which "1" and "0" alternate at every lapse of the predetermined time T. In this example, the time length of the predetermined time T is configured to be variable. The pretraining pattern PATpre includes a pattern having a pulse frequency of 5 GHz in a period from a timing t1 to a timing t2 (a period A), and a pattern having a pulse frequency of 2.5 GHz in a period from the timing t2 to a timing t3 (a period B). In other words, the time length of the predetermined time T in the period from the timing t2 to the timing t3 is set to twice the time length of the predetermined time T in the period from the timing t1 to the timing t2. In this example, in the pretraining pattern PATpre, the pattern having a pulse frequency of 5 GHz (the period A) and the pattern having a pulse frequency of 2.5 GHz (the period B) are alternately provided. It is to be noted that in this example, two cycles of the pattern are provided in the period A, and two cycles of the pattern are provided in the period B, but this is not limitative. For example, three or more cycles of the pattern may be provided in the period A, and three or more cycles of the pattern may be provided in the period B.

The reception device 30C includes a transmission loss detector 35C and a processor 40C. In a case where the transmission device 10 transmits the signal SIG including the pretraining pattern PATpre (FIG. 10), the transmission loss detector 35C is configured to detect frequency components of 2.5 GHz and 5 GHz included in the signal SIG.

(A) of FIG. 11 indicates a signal level of the signal SIG at an output terminal of the transmission device 10C, and (B) of FIG. 11 indicates a signal level of the signal SIG at an input terminal of the reception device 30C. The signal SIG includes the pretraining pattern PATpre (FIG. 10), and therefore includes the frequency components of 2.5 GHz and 5 GHz in this example. The signal level of the signal SIG is attenuated by the transmission path 100. The transmission loss detector 35C detects the frequency components of 2.5 GHz and 5 GHz included in the signal SIG attenuated by the transmission path 100. The transmission loss detector 35C then supplies a result of detection to the processor 40C.

The processor 40C includes an equalization characteristic adjuster 42C. As with the equalization characteristic adjuster 42 according to the above-described embodiment, the equalization characteristic adjuster 42C is configured to adjust the equalization characteristics of the CTLE circuit 31A and the DFE circuit 31B on the basis of a result of detection by the eye opening detector 34, and generate instruction information about the equalization characteristics of the FFE circuit 13A in the transmission device 10C. In addition, the equalization characteristic adjuster 42C also has a function of generating instruction information about the equalization characteristics of the FFE circuit 13A in the transmission device 10C on the basis of a result of detection by the transmission loss detector 35C. The transmission loss detector 35C is able to detect two frequency components, which allows the equalization characteristic adjuster 42C to generate more detailed instruction information about the equalization characteristics of the FFE circuit 13A on the basis of a result of such detection. Specifically, the equalization characteristic adjuster 42C is able to generate instruction information about each of a plurality of taps of the FFE circuit 13A.

FIG. 12 illustrates an example of an operation of adjusting equalization characteristics in the communication system 1C. The communication system 1C adjusts the equalization characteristics of the FFE circuit 13A on the basis of the signal SIG including the pretraining pattern PATpre illustrated in FIG. 10 as illustrated in steps S121 to S124.

Specifically, in a case where the operation mode M of the communication system 1C is shifted to the startup mode M2, the transmission device 10C first starts transmission of the signal SIG including the pretraining pattern PATpre illustrated in FIG. 10 (step S121).

Next, the transmission loss detector 35C of the reception device 30C detects each of the frequency components (the frequency components of 2.5 GHz and 5 GHz in this example) included in the signal SIG (step S122).

Next, the communication system 1C adjusts the equalization characteristics of the FFE circuit 13A (step S123). Specifically, the equalization characteristic adjuster 42C generates instruction information about the equalization characteristics of the FFE circuit 13A of the transmission device 10C on the basis of a result of detection by the transmission loss detector 35C. For example, the equalization characteristic adjuster 42C generates instruction information about each of the plurality of taps of the FFE circuit 13A. The control signal generator 43 supplies a control signal including this instruction information to the transmitter 36, and the transmitter 36 generates the control signal SCTL on the basis of this control signal, and transmits the generated control signal SCTL to the transmission device 10C. The receiver 14 of the transmission device 10C receives the control signal SCTL, and the control signal analyzer 26 analyzes control information included in the control signal SCTL. The equalization characteristic adjuster 27 then adjusts the equalization characteristics of the FFE circuit 13A on the basis of the instruction information about the equalization characteristics of the FFE circuit 13A included in the control signal SCTL.

Then, operations in the steps S122 and S123 are repeated until a predetermined time has passed since start of transmission of the signal SIG including the pretraining pattern PATpre by the transmission device 10C in the step S121 (step S124).

It is to be noted that in this example, the pattern of 2.5 GHz (the period A) and the pattern of 5 GHz (the period B) are alternately provided in the pretraining pattern PATpre, but this is not limitative. Alternatively, for example, as illustrated in FIG. 13, in the pretraining pattern PATpre, a sufficiently long pattern of 2.5 GHz (a period D) may be provided following a sufficiently long pattern of 5 GHz (a period C). In this case, the transmission loss detector 35C of the reception device 30C is able to detect the amplitude of the signal SIG including the pattern of 5 GHz in the period C, and detect the amplitude of the signal SIG including the pattern of 2.5 GHz in the period D. In addition, for example, a sufficiently long pattern of 5 GHz may be provided following a sufficiently long pattern of 2.5 GHz.

In this example, the pretraining pattern PATpre includes patterns of two pulse frequencies (2.5 GHz and 5 GHz in this example), but this is not limitative. Alternatively, for example, patterns of three or more pulse frequencies may be included.

In addition, in this example, the equalization characteristic adjuster 42C of the reception device 30C generates instruction information about the equalization characteristics of the FFE circuit 13A of the transmission device 10C with use of a plurality of (two in this example) frequency components detected by the transmission loss detector 35C, but this is not limitative. Alternatively, the equalization characteristic adjuster 42C may generate instruction information about the equalization characteristics of the FFE circuit 13A of the transmission device 10C, for example, on the basis of some frequency components of a plurality of frequency components detected by the transmission loss detector 35C. This modification example is described in detail below.

FIG. 14 schematically illustrates a characteristic example of the transmission path 100. A horizontal axis indicates frequency, and a vertical axis indicates transmission loss in the transmission path 100. In this example, transmission loss is increased at a certain frequency f1. Such local transmission loss may be caused by, for example, reflection by a connector, and the like.

(A) of FIG. 15 illustrates the signal level of the signal SIG at the output terminal of the transmission device 10C, and (B) of FIG. 15 illustrates the signal level of the signal SIG at the input terminal of the reception device 30C. In this example, the pretraining pattern PATpre includes three pulse frequency patterns. As illustrated in (B) of FIG. 15, one (a frequency component W3) of three frequency components included in the signal SIG is greatly attenuated due to characteristics (FIG. 14) of the transmission path 100. The equalization characteristic adjuster 42C generates instruction information about the equalization characteristics of the FFE circuit 13A on the basis of two frequency components other than the frequency component W3 of the three frequency components. That is, the frequency component W3 of the three frequency components has a sufficiently low signal level, as compared with other two frequency components, and is deviated from a normal transmission line model; therefore, the equalization characteristic adjuster 42C determines that local transmission loss occurs at a frequency corresponding to the frequency component W3, and excludes the frequency component W3. This allows the communication system 1C to appropriately adjust the equalization characteristics of the FFE circuit 13A, which consequently makes it possible to enhance communication quality.

Modification Example 1-4

In the above-described embodiment, the equalization characteristics of the FFE circuit 13A are adjusted on the basis of transmission loss in the transmission path 100, but this is not limitative. For example, prior to this, the equalization characteristics of the FFE circuit 13A may be adjusted on the basis of reflection characteristics in the transmission path 100. This operation is described in detail below.

FIG. 16 illustrates a configuration example of a communication system 1D. The communication system 1D includes a transmission device 10D and a reception device 30D.

The transmission device 10D includes a processor 20D. The processor 20D includes a pulse generator 24D and a selector 25D. The pulse generator 24D is configured to generate a single pulse PU. A pulse width of this pulse PU is, for example, 100 psec. (=1 unit interval). The selector 25D is configured to select one of the output signal of the transmission data generator 21, the output signal of the training pattern generator 22, the output signal of the pretraining pattern generator 23, and an output signal of the pulse generator 24D.

The reception device 30D includes a reflection detector 37D and a processor 40D.

In a case where the transmission device 10D transmits the signal SIG including the pulse PU, the reflection detector 37D is configured to be able to detect this pulse PU and a reflected pulse PUR corresponding to this pulse PU. The reflection detector 37D is configured using an AD conversion circuit or an amplitude detection circuit, for example.

FIG. 17 illustrates an example of a waveform at an input terminal of the reception device 30D in a case where the transmission device 10D transmits the signal SIG including the pulse PU. For example, in a case where the reflected pulse PUR is generated corresponding to the pulse PU, the reflection detector 37D detects a time difference Δt between the pulse PU and the reflected pulse PUR and an amplitude Apur of the reflected pulse PUR.

The processor 40D includes an equalization characteristic adjuster 42D. As with the equalization characteristic adjuster 42 according to the above-described embodiment, the equalization characteristic adjuster 42D is configured to adjust the equalization characteristics of the CTLE circuit 31A and the DFE circuit 31B on the basis of a result of detection by the eye opening detector 34, and generate instruction information about the equalization characteristics of the FFE circuit 13A in the transmission device 10D. In addition, the equalization characteristic adjuster 42D also has a function of generating instruction information about the equalization characteristics of the FFE circuit 13A in the transmission device 10D on the basis of a result of detection by the transmission loss detector 35. In addition, the equalization characteristic adjuster 42D also has a function of generating instruction information about the equalization characteristics of the FFE circuit 13A in the transmission device 10D on the basis of a result of detection by the reflection detector 37D. The reflection detector 37D is able to detect the time difference Δt between the pulse PU and the reflected pulse PUR and the amplitude Apur of the reflected pulse PUR, which allows the equalization characteristic adjuster 42D to generate instruction information about the equalization characteristics of the FFE circuit 13A on the basis of a result of such detection. Specifically, the equalization characteristic adjuster 42D sets a coefficient of a tap corresponding to the time difference Δt of the plurality of taps of the FFE circuit 13A to a value corresponding to the amplitude Apur. This allows the reflective pulse PUR to be inconspicuous in the waveform at the input terminal of the reception device 30D.

Here, the pulse generator 24D corresponds to a specific example of a "pulse generator" in the present disclosure. The reflection detector 37D corresponds to a specific example of a "second detector" in the present disclosure.

FIG. 18 illustrates an example of an operation of adjusting equalization characteristics in the communication system 1D. The communication system 1D adjusts the equalization characteristics of the FFE circuit 13A on the basis of the signal SIG including the single pulse PU as illustrated in steps S131 to S133.

Specifically, in a case where the operation mode M of the communication system 1D is shifted to the startup mode M2, the transmission device 10D first starts transmission of the signal SIG including the single pulse PU (the step S131).

Next, in a case where the reflected pulse PUR is generated corresponding to the pulse PU, the reflection detector 37D of the reception device 30D detects the time difference Δt between the pulse PU and the reflected pulse PUR and the amplitude Apur of the reflected pulse PUR (the step S132).

Next, the communication system 1D adjusts the equalization characteristics of the FFE circuit 13A (the step S133). Specifically, the equalization characteristic adjuster 42D generates instruction information about the equalization characteristics of the FFE circuit 13A of the transmission device 10D on the basis of a result of detection by the reflection detector 37D. The equalization characteristic adjuster 42D generates instruction information that the coefficient of the tap corresponding to the time difference Δt of the plurality of taps of the FFE circuit 13A is to be set to a value corresponding to the amplitude Apur. The control signal generator 43 supplies a control signal including this instruction information to the transmitter 36, and the transmitter 36 generates the control signal SCTL on the basis of this control signal, and transmits the generated control signal SCTL to the transmission device 10D. The receiver 14 of the transmission device 10D receives the control signal SCTL, and the control signal analyzer 26 analyzes control information including the control signal SCTL. The equalization characteristic adjuster 27 then adjusts the equalization characteristics of the FFE circuit 13A on the basis of instruction information about the equalization characteristics of the FFE circuit 13A included in the control signal SCTL.

Thereafter, the communication system 1D then adjusts the equalization characteristics of the FFE circuit 13A on the basis of the signal SIG including the pretraining pattern PATpre that is an alternate pattern in the steps S101 to S104. At this time, the communication system 1D adjusts the equalization characteristics of the FFE circuit 13A on the basis of the signal SIG including the pretraining pattern PATpre with use of the equalization characteristics of the FFE circuit 13A adjusted in the step S133 as initial characteristics.

It is to be noted that in this example, the equalization characteristic adjuster 42D generates instruction information about the equalization characteristics of the FFE circuit 13A in the transmission device 10D on the basis of a result of detection by the reflection detector 37D, but this is not limitative. Alternatively, for example, the equalization characteristic adjuster 42D may adjust the equalization characteristics of the DFE circuit 31B on the basis of a result of detection by the reflection detector 37D. In addition, the equalization characteristic adjuster 42D may generate instruction information about the equalization characteristics of the FFE circuit 13A in the transmission device 10D on the basis of a result of detection by the reflection detector 37D and adjust the equalization characteristics of the DFE circuit 31B.

In addition, in this example, the reflection detector 37D is provided in the reception device 30D, but this is not limitative. Alternatively, for example, like a communication system 1E illustrated in FIG. 19, a reflection detector may be provided in a transmission device. The communication system 1E includes a transmission device 10E and the reception device 30. The transmission device 10E includes a reflection detector 15E and a processor 20E. In a case where the transmission device 10E transmits the signal SIG including the pulse PU, the reflection detector 15E is configured to be able to detect this pulse PU and the reflected pulse PUR corresponding to this pulse PU. The processor 20E includes an equalization characteristic adjuster 27D. As with the equalization characteristic adjuster 27 according to the above-described embodiment, in a case where instruction information about the equalization characteristics of the FFE circuit 13A is included in the control signal SCTL, the equalization characteristic adjuster 27D is configured to adjust the equalization characteristics of the FFE circuit 13A on the basis of this instruction information. In addition, the equalization characteristic adjuster 27D also has a function of adjusting the equalization characteristics of the FFE 13A on the basis of a result of detection by the reflection detector 15E. Here, the reflection detector 15E corresponds to a specific example of a "third detector" in the present disclosure.

Other Modification Examples

In addition, two or more of these modification examples may be combined.

2. Second Embodiment

Next, a communication system 2 according to a second embodiment is described. The present embodiment is configured to be able to switch a signal format of the signal SIG to be transmitted and received between an NRZ signal and a PAM (Pulse Amplitude Modulation)4 signal. It is to be noted that components substantially the same as those of the communication system 1 according to the above-described first embodiment are denoted by the same reference numerals, and description thereof is omitted as appropriate.

FIG. 20 illustrates a configuration example of the communication system 2 according to the present embodiment. The communication system 2 is configured to be able to switch the signal format of the signal SIG to be transmitted and received between the NRZ signal and the PAM4 signal.

(A) of FIG. 21 indicates the NRZ signal, and (B) of FIG. 21 indicates the PAM4 signal. The PAM4 signal indicates two bits of information with use of four voltage levels. In a case where the signal SIG of 10 Gbps is transmitted with use of the NRZ signal, one unit interval is 100 psec., and in a case where the signal SIG of 10 Gbps is transmitted with use of the PAM4 signal, one unit interval is 200 psec.

As illustrated in FIG. 20, the communication system 2 includes a transmission device 50 and a reception device 70.

The transmission device 50 includes a processor 60, a serializer 51, a clock generator 52, a transmitter 53, and the receiver 14.

The processor 60 includes a transmission data generator 61, a training pattern generator 62, a pretraining pattern generator 63, a selector 65, a control signal analyzer 66, the equalization characteristic adjuster 27, and a signal format setting section 67. The training pattern generator 62 and the pretraining pattern generator 63 are included in a pattern generator 69.

FIG. 22 illustrates configuration examples of the transmission data generator 61, the training pattern generator 62, the pretraining pattern generator 63, the selector 65, and the serializer 51.

The transmission data generator 61 is configured to generate the transmission data DT including information to be transmitted from the transmission device 50 to the reception device 70. Specifically, in a case where the transmission device 50 transmits the NRZ signal, the transmission data generator 61 generates two pieces of the transmission data DT that are shifted by one bit from each other, and supplies each of the two pieces of the transmission data DT to a corresponding one of the two selectors 65A and 65B (to be described later) in the selector 65. The two pieces of the transmission data DT are synthesized by a FFE circuit 53A of the transmitter 53 to generate the signal SIG that is the NRZ signal. In addition, in a case where the transmission device 50 transmits the PAM4 signal, the transmission data generator 61 generates two pieces of the transmission data DT, and supplies each of the two pieces of the transmission data DT to a corresponding one of the two selectors 65A and 65B (to be described later) in the selector 65. The two pieces of the transmission data DT are synthesized by the FFE circuit 53A and a modulation circuit 53B of the transmitter 53 to generate the signal SIG that is the PAM4 signal.

The training pattern generator 62 is configured to generate the training pattern PAT that is a pseudo-random pattern. Specifically, as with the transmission data generator 61, in a case where the transmission device 50 transmits the NRZ signal, the training pattern generator 62 generates two training patterns PAT that are shifted by one bit from each other, and supplies each of the two training patterns PAT to a corresponding one of the two selectors 65A and 65B (to be described later) in the selector 65. The two training patterns PAT are synthesized by the FFE circuit 53A of the transmitter 53 to generate the signal SIG that is the NRZ signal.

In addition, as with the transmission data generator 61, in a case where the transmission device 50 transmits the PAM4 signal, the transmission data generator 61 generates two training patterns PAT, and supplies each of the two training patterns PAT to a corresponding one of the two selectors 65A and 65B (to be described later) in the selector 65. The two training patterns PAT are synthesized by the FFE circuit 53A and the modulation circuit 53B of the transmitter 53 to generate the signal SIG that is the PAM4 signal.

The pretraining pattern generator 63 is configured to generate the pretraining pattern PATpre that is an alternate pattern. As with the pretraining pattern generator 23C according to the modification example 1-3 of the first embodiment described above, the pretraining pattern PATpre generated by the pretraining pattern generator 63 includes a plurality of pulse frequency patterns. As with the transmission data generator 61, in a case where the transmission device 50 transmits the NRZ signal, the pretraining pattern generator 63 generates two pretraining patterns PATpre that are shifted by one bit from each other, and supplies each of the two pretraining patterns PATpre to a corresponding one of the two selectors 65A and 65B (to be described later) in the selector 65. The two pretraining patterns PATpre are synthesized by the FFE circuit 53A of the transmitter 53 to generate the signal SIG that is the NRZ signal. In addition, as with the transmission data generator 61, in a case where the transmission device 50 transmits the PAM4 signal, the pretraining pattern generator 63 generates two pretraining patterns PATpre, and supplies each of the two pretraining patterns PATpre to a corresponding one of the two selectors 65A and 65B (to be described later) in the selector 65. The two pretraining patterns PATpre are synthesized by the FFE circuit 53A and the modulation circuit 53B of the transmitter 53 to generate the signal SIG that is the PAM4 signal.

The selector 65 includes two selectors 65A and 65B. The selector 65A is configured to select one of a first output signal of the transmission data generator 61, a first output signal of the training pattern generator 62, and a first output signal of the pretraining pattern generator 63. The selector 65B is configured to select one of a second output signal of the transmission data generator 61, a second output signal of the training pattern generator 62, and a second output signal of the pretraining pattern generator 63.

The serializer 51 includes two serializers 51A and 51B. The serializer 51A is configured to generate a data signal that is a serial signal on the basis of a parallel signal supplied from the selector 65A and a clock signal supplied from the clock generator 52. The serializer 51B is configured to generate a data signal that is a serial signal on the basis of a parallel signal supplied from the selector 65B and a clock signal supplied from the clock generator 52.

The clock generator 52 is configured to generate a clock signal. Specifically, the clock generator 52 generates a clock signal having a clock frequency of 10 GHz in a case where the transmission device 50 transmits the NRZ signal, and generates a clock signal having a clock frequency of 5 GHz in a case where the transmission device 50 transmits the PAM4 signal. That is, the serializers 51A and 51B perform serialization on the basis of the clock signal having a clock frequency of 10 GHz in a case where the transmission device 50 transmits the NRZ signal, and perform serialization on the basis of the clock signal having a clock frequency of 5 GHz in a case where the transmission device 50 transmits the PAM4 signal.

The transmitter 53 is configured to generate the signal SIG on the basis of data signals supplied from the serializers 51A and 51B and transmit the generated signal SIG to the reception device 70. The transmitter 53 includes the FFE circuit 53A and the modulation circuit 53B. Examples of the FFE circuit 53A include an equalization circuit such as a pre-emphasis circuit and a deemphasis circuit, and is configured to have variable equalization characteristics. The modulation circuit 53B is configured to generate the PAM4 signal. The modulation circuit 53B operates in a case where the transmission device 50 transmits the PAM4 signal.

The control signal analyzer 66 (FIG. 20) is configured to analyze control information included in the control signal SCTL on the basis of the control signal SCTL received by the receiver 14.

In a case where the control signal SCTL includes instruction information about a signal format to be used in the communication system 2, the signal format setting section 67 is configured to set the signal format to be used on the basis of the instruction information. The signal format setting section 67, the signal format setting section 67 controls operations of the transmission data generator 61, the training pattern generator 62, the pretraining pattern generator 63, the selector 65, the clock generator 52, and the transmitter 53 on the basis of the instruction information.

The reception device 70 includes a receiver 71, the CDR circuit 32, the deserializer 33, an eye opening detector 74, a transmission loss detector 75, the transmitter 36, and a processor 80.

The receiver 71 is configured to receive the signal SIG transmitted from the transmission device 50. The receiver 71 includes a CTLE circuit 71A and a DFE circuit 71B. The CTLE circuit 31A is a linear equalization circuit of the continuous-time type, and is configured to have variable equalization characteristics. The DFE circuit 71B is an equalization circuit of the decision feedback type, and is configured to have variable equalization characteristics. The receiver 71 is configured to be able to receive both the NRZ signal and the PAM4 signal.

In a case where the transmission device 50 transmits the signal SIG including the pretraining pattern PATpre, the transmission loss detector 75 is configured to detect a plurality of frequency components included in this signal SIG.

The eye opening detector 74 is configured to detect a size of an eye opening of an addition signal in the DFE circuit 71B. The eye opening detector 74 is configured to be able to detect sizes of eye openings of the NRZ signal and the PAM4 signal.

The processor 80 includes the bit error rate detector 41, an equalization characteristic adjuster 82, a signal format determining section 84, and a control signal generator 83.

The equalization characteristic adjuster 82 is configured to adjust the equalization characteristics of the CTLE circuit 31A and the DFE circuit 31B on the basis of a result of detection by the eye opening detector 74 and generate instruction information about the equalization characteristics of the FFE circuit 13A in the transmission device 50.

The signal format determining section 84 is configured to determine the signal format on the basis of a result of detection by the transmission loss detector 75 in a case where the transmission device 50 transmits the signal SIG including the pretraining pattern PATpre (FIG. 2).

(A) of FIG. 23 schematically illustrates a characteristic example of the transmission path 100. (B) of FIG. 23 illustrates a spectrum WN of the NRZ signal and a spectrum WP of the PAM4 signal. In this example, as illustrated in (A) of FIG. 23, transmission loss is increased in a certain frequency band. Such local transmission loss may be caused by, for example, reflection by a connector, and the like. As illustrated in (B) of FIG. 23, in the NRZ signal, a signal is transmitted with use of a wide frequency band, and in the PAM4 signal, a signal is transmitted with use of a narrower frequency band. In this example, a portion of a frequency band of the NRZ signal overlaps a frequency band in which transmission loss is large, whereas a frequency band of the PAM4 signal does not overlap the frequency band in which transmission loss is large.

FIG. 24A indicates a signal level of the signal SIG at an output terminal of the transmission device 50, and FIG. 24B indicates a signal level of the signal at an input terminal of the reception device 70. In this example, the pretraining pattern PATpre includes three pulse frequency patterns. As illustrated in FIG. 24B, two (frequency components W4 and W5) of three frequency components included in the signal SIG are greatly attenuated due to characteristics of the transmission path 100 ((A) of FIG. 23). The signal format determining section 84 determines the PAM4 signal as the signal format to be used, on the basis of the three frequency components. That is, the frequency components W4 and W5 of the three frequency components have a sufficiently low signal level, as compared with the other one frequency component, and are deviated from a normal transmission line model. Accordingly, the signal format determining section 84 determines that local transmission loss occurs at frequencies corresponding to the frequency components W4 and W5, and selects the PAM4 signal that is a signal format that does not use this frequency band.

As described above, the signal format determining section 84 determines the signal format to be used, on the basis of a result of detection by the transmission loss detector 75. The signal format determining section 84 then instructs the receiver 71 to receive a signal of the determined signal format, and generates instruction information about the signal format to be used. The signal format determining section 84 then supplies this instruction information to the control signal generator 83.

The control signal generator 83 is configured to generate control information to be transmitted to the transmission device 50, and supply a control signal including the generated control information to the transmitter 36. The control signal generator 83 generates a control signal including this instruction information, for example, in a case where instruction information about the signal format to be used is supplied from the signal format determining section 84.

Here, the transmitter 53 corresponds to a specific example of a "transmitter" in the present disclosure. The signal format determining section 84 corresponds to a specific example of a "determining section" in the present disclosure. The receiver 71 corresponds to a specific example of a "receiver" in the present disclosure.

FIG. 25 illustrates an example of an operation of adjusting equalization characteristics in the communication system 2. As illustrated in steps S201 to S204, the communication system 2 determines the signal format on the basis of the signal SIG including the pretraining pattern PATpre, and thereafter adjusts the equalization characteristics of the FFE circuit 13A. This operation is described in detail below.

Specifically, in a case where the operation mode M of the communication system 2 is shifted to the startup mode M2, the transmission device 50 first starts transmission of the signal SIG including the pretraining pattern PATpre (step S201). Specifically, the pretraining pattern generator 63 generates two pretraining patterns PATpre that are shifted by one bit from each other, and supplies each of the two pretraining patterns PATpre to a corresponding one of the two selectors 65A and 65B in the selector 65. The selector 65A selects the first output signal of the pretraining pattern generator 63, and the selector 65B selects the second output signal of the pretraining pattern generator 63. The serializer 51A serializes the signal selected by the selector 65A on the basis of a cock signal of 10 GHz, and the serializer 51B serializes the signal selected by the selector 65B on the basis of a clock signal of 10 GHz. The transmitter 53 then generates the signal SIG that is the NRZ signal and includes the pretraining patterns PATpre on the basis of the signals supplied from the serializers 51A an d51B, and transmits the signal SIG. The reception device 70 receives the signal SIG.

Next, the transmission loss detector 35C of the reception device 70 detects each of frequency components included in the signal SIG (step S202).

Next, the signal format determining section 84 of the reception device 70 determines the signal format on the basis of a result of detection by the transmission loss detector 75 (step S203). The signal format determining section 84 then instructs the receiver 71 to receive a signal of the determined signal format, and generates instruction information about the signal format to be used. The control signal generator 83 supplies a control signal including this instruction information to the transmitter 36, and the transmitter 36 generates the control signal SCTL on the basis of this control signal, and transmits the generated control signal SCTL to the transmission device 50. The receiver 14 of the transmission device 50 receives the control signal SCTL, and the control signal analyzer 66 analyzes control information included in the control signal SCTL. The signal format setting section 67 then controls operations of the transmission data generator 61, the training pattern generator 62, the pretraining pattern generator 63, the selector 65, the clock generator 52, and the transmitter 53 on the basis of instruction information about the signal format to be used.

Next, the transmission device 50 starts transmission of the signal SIG including the pretraining pattern PATpre that is an alternate pattern, in the signal format determined in the step S203 (step S204).

For example, in a case where the signal format to be used is the NRZ signal, the pretraining pattern generator 63 generates two pretraining patterns PATpre that are shifted by one bit from each other, and supplies each of the two pretraining patterns PATpre to a corresponding one of the two selectors 65A and 65B. The selector 65A selects the first output signal of the pretraining pattern generator 63, and the selector 65B selects the second output signal of the pretraining pattern generator 63. The serializer 51A serializes the signal selected by the selector 65A on the basis of the clock signal of 10 GHz, and the serializer 51B serializes the signal selected by the selector 65B on the basis of the clock signal of 10 GHz. The transmitter 53 then generates the signal SIG that is the NRZ signal and includes the pretraining patterns PATpre on the basis of the signals supplied from the serializer 51A and 51B. The reception device 70 receives the signal SIG.

For example, in a case where the signal format to be used is the PAM4 signal, the pretraining pattern generator 63 generates two pretraining patterns PATpre, and supplies each of the two pretraining patterns PATpre to a corresponding one of the two selectors 65A and 65B. The selector 65A selects the first output signal of the pretraining pattern generator 63, and the selector 65B selects the second output signal of the pretraining pattern generator 63. The serializer 51A serializes the signal selected by the selector 65A on the basis of a clock signal of 5 GHz, and the serializer 51B serializes the signal selected by the selector 65B on the basis of the clock signal of 5 GHz. The transmitter 53 then generates the signal SIG that is the PAM4 signal and includes the pretraining patterns PATpre on the basis of the signals supplied from the serializers 51A and 51B, and transmits the signal SIG. The reception device 70 receives the signal SIG.

The communication system 2 then adjusts the equalization characteristics of the FFE circuit 13A on the basis of the signal SIG including the pretraining patterns PATpre in the steps S122 to S124.

Next, the transmission device 50 starts transmission of the signal SIG including the training pattern PAT that is a pseudo-random pattern in the signal format determined in the step S203 (step S204).

For example, in a case where the signal format to be used is the NRZ signal, the training pattern generator 62 generates two training patterns PATpre that are shifted by one bit from each other, and supplies each of the two training patterns PAT to a corresponding one of the two selectors 65A and 65B. The selector 65A selects the first output signal of the training pattern generator 62, and the selector 65B selects the second output signal of the training pattern generator 62. The serializer 51A serializes the signal selected by the selector 65A on the basis of the clock signal of 10 GHz, and the serializer 51B serializes the signal selected by the selector 65B on the basis of the clock signal of 10 GHz. The transmitter 53 then generates the signal SIG that is the NRZ signal and includes the training patterns PAT on the basis of the signals supplied from the serializers 51A and 51B, and transmits the signal SIG. The reception device 70 receives the signal SIG.

For example, in a case where the signal format to be used is the PAM4 signal, the training pattern generator 62 generates two training patterns PATpre, and supplies each of the two training patterns PAT to a corresponding one of the two selectors 65A and 65B. The selector 65A selects the first output signal of the training pattern generator 62, and the selector 65B selects the second output signal of the training pattern generator 62. The serializer 51A serializes the signal selected by the selector 65A on the basis of the clock signal of 5 GHz, and the serializer 51B serializes the signal selected by the selector 65B on the basis of the clock signal of 5 GHz. The transmitter 53 then generates the signal SIG that is the PAM4 signal and includes the training patterns PAT on the basis of the signals supplied from the serializers 51A and 51B, and transmits the signal SIG. The reception device 70 receives the signal SIG.

The communication system 2 then adjusts the equalization characteristics of the CTLE circuit 31A and the DFE circuit 31B on the basis of the signal SIG including the training patterns PAT in the steps S106 and S107.

The operation mode M of the communication system 2 is then shifted from the startup mode M2 to the normal mode M3, and the transmission device 50 starts transmission of the signal SIG including the transmission data DT in the determined signal (step S208).

For example, in a case where the signal format to be used is the NRZ signal, the transmission data generator 61 generates two pieces of the transmission data DT that are shifted by one bit from each other, and supplies each of the two pieces of the transmission data DT to a corresponding one of the two selectors 65A and 65B. The selector 65A selects the first output signal of the transmission data generator 61, and the selector 65B selects the second output signal of the transmission data generator 61. The serializer 51A serializes the signal selected by the selector 65A on the basis of the clock signal of 10 GHz, and the serializer 51B serializes the signal selected by the selector 65B on the basis of the clock signal of 10 GHz. The transmitter 53 then generates the signal SIG that is the NRZ signal and includes the transmission data DT on the basis of the signals supplied from the serializers 51A and 51B, and transmits the signal SIG.

For example, in a case where the signal format to be used is the PAM4 signal, the transmission data generator 61 generates two pieces of the transmission data DT, and supplies each of the two pieces of the transmission data DT to a corresponding one of the two selectors 65A and 65B. The selector 65A selects the first output signal of the transmission data generator 61, and the selector 65B selects the second output signal of the transmission data generator 61. The serializer 51A serializes the signal selected by the selector 65A on the basis of the clock signal of 5 GHz, and the serializer 51B serializes the signal selected by the selector 65B on the basis of the clock signal of 5 GHz. The transmitter 53 then generates the signal SIG that is the PAM4 signal and includes the transmission data DT on the basis of the signals supplied from the serializers 51A and 51B, and transmits the signal SIG.

The communication system 2 then adjusts the equalization characteristics of the CTLE circuit 31A and the DFE circuit 31B on the basis of the signal SIG including the transmission data DT in the steps S109 and S110.

As described above, the communication system 2 determines the signal format to be used, on the basis of a plurality of frequency components included in the signal SIG in a case where the transmission device 50 transmits the signal SIG including the pretraining pattern PATpre. Accordingly, for example, even in a case where local transmission loss occurs, the communication system 2 is able to select a signal format enabling avoidance of a frequency band in which such transmission loss occurs, which makes it possible to enhance communication quality.

As described above, in the present embodiment, the signal format to be used is determined on the basis of a plurality of frequency components included in a signal including a pretraining pattern in a case where the signal is transmitted, which makes it possible to enhance communication quality. Other effects are similar to those in the above-described embodiment.

Modification Example 2-1

In the above-described embodiment, the signal format of the signal SIG to be transmitted and received is switched between the NRZ signal and the PAM4 signal, but this is not limitative. For example, any other signal format such as PAM16 may be selected.

Modification Example 2-2

Any of the respective medication examples of the first embodiment described above may be applied to the communication system 2 according to the above-described embodiment.

Although the present technology has been described above with reference to some embodiments and modification examples, the present technology is not limited to these embodiments and the like, and may be modified in a variety of ways.

For example, in the respective embodiments described above, the bit rate is 10 Gbps, but is not limited thereto. The bit rate may be lower than 10 Gbps, or may be higher than 10 Gbps.

It is to be noted that the effects described in this specification are merely illustrative and non-limiting, and other effects may be provided.

It is to be noted that the present technology may have the following configurations. According to the present technology of the following configurations, for example, a transmission signal transmits a transmission signal including an alternate pattern alternating at every lapse of a predetermined time, and a reception device detects a frequency component corresponding to the predetermined time of the alternate pattern included in the transmission signal, and a first equalization circuit of the transmission device adjusts equalization characteristics on the basis of a result of such detection, which makes it possible to enhance communication quality.

(1)

A communication system including:

a transmission device including a transmission data generator, a pattern generator, a transmitter, and a control signal receiver, the transmission data generator that is configured to generate transmission data, the pattern generator that is configured to generate an alternate pattern alternating at every lapse of a predetermined time, the transmitter that includes a first equalization circuit and is configured to transmit a transmission signal including the transmission data and the alternate pattern, the first equalization circuit that is configured to adjust equalization characteristics on the basis of first instruction information, and the control signal receiver that is configured to receive the first instruction information; and a reception device including a receiver, a first detector, and a control signal transmitter, the receiver that is configured to receive the transmission signal, the first detector that is configured to detect a frequency component corresponding to the predetermined time of the alternate pattern included in the transmission signal, and the control signal transmitter that is configured to generate the first instruction information on the basis of a result of detection by the first detector and is configured to transmit the first instruction information.

(2)

The communication system according to (1), in which the pattern generator is configured to change a time length of the predetermined time.

(3)

The communication system according to (2), in which the alternate pattern included in the transmission signal includes a plurality of frequency components corresponding to the predetermined times different from each other, the first detector is configured to detect the plurality of frequency components, and the control signal transmitter is configured to generate the first instruction information on the basis of the plurality of frequency components detected by the first detector.

(4)

The communication system according to (3), in which the control signal transmitter is configured to generate the first instruction information on the basis of some of the plurality of frequency components detected by the first detector.

(5)

The communication system according to any one of (1) to (4), in which the transmission device further includes a pulse generator that is configured to generate a single pulse, the transmission signal includes the single pulse, in the transmission signal, the single pulse is provided preceding the alternate pattern, the reception device includes a second detector that is configured to detect a reflected pulse corresponding the single pulse included in the transmission signal, and the control signal transmitter is configured to generate the first instruction information on the basis of a result of detection by the second detector.

(6)

The communication system according to any one of (1) to (5), in which the transmission device further includes a pulse generator that is configured to generate a single pulse, the transmission signal includes the single pulse, in the transmission signal, the single pulse is provided preceding the alternate pattern, the reception device includes a second detector that is configured to detect a reflected pulse corresponding the single pulse included in the transmission signal, and the receiver includes a second equalization circuit that is configured to adjust equalization characteristics on the basis of a result of detection by the second detector.

(7)

The communication system according to any one of (1) to (4), in which the transmission device further includes a pulse generator that is configured to generate a single pulse, the transmission signal includes the single pulse, in the transmission signal, the single pulse is provided preceding the alternate pattern, the transmission device includes a third detector that is configured to detect a reflected pulse corresponding the single pulse included in the transmission signal, and the first equalization circuit is configured to adjust equalization characteristics on the basis of a result of detection by the third detector.

(8)

The communication system according to any one of (1) to (7), in which the pattern generator is configured to further generate a training pattern, the transmission signal includes the training pattern, in the transmission signal, the training pattern is provided following the alternate pattern and preceding the transmission data, the reception device includes a waveform detector that detects a waveform of a signal corresponding to the training pattern in the receiver, the receiver includes a second equalization circuit of a decision feedback type and a third equalization circuit of a continuous-time type, the second equalization circuit that is configured to adjust equalization characteristics, the third equalization circuit that is provided in a stage preceding the second equalization circuit and is configured to adjust equalization characteristics, and the first equalization circuit, the second equalization circuit, and the third equalization circuit are configured to adjust equalization characteristics on the basis of a result of detection by the waveform detector.

(9)

The communication system according to any one of (1) to (7), in which in the transmission signal, the transmission data is provided following the alternate pattern, the reception device includes a waveform detector that detects a waveform of a signal based on the transmission data in the receiver, the receiver includes a second equalization circuit of a decision feedback type and a third equalization circuit of a continuous-time type, the second equalization circuit that is configured to adjust equalization characteristics, the third equalization circuit that is provided in a stage preceding the second equalization circuit and is configured to adjust equalization characteristics, and the first equalization circuit, the second equalization circuit, and the third equalization circuit are configured to adjust equalization characteristics on the basis of a result of detection by the waveform detector.

(10)

The communication system according to any one of (1) to (9), in which the communication system is configured to transmit and receive signals of a plurality of signal formats, the pattern generator is configured to change a time length of the predetermined time, the alternate pattern included in the transmission signal includes a plurality of frequency components corresponding to the predetermined times different from each other, the first detector is configured to detect the plurality of frequency components, the reception device further includes a determining section that is configured to determine a signal format to be used from the plurality of signal formats on the basis of the plurality of the frequency components detected by the first detector, the control signal transmitter is configured to generate second instruction information on the basis of a result of determination by the determining section, and is configured to transmit the second instruction information, the control signal receiver is configured to receive the second instruction information, the transmitter is configured to transmit a signal of the signal format to be used on the basis of the second instruction information, and the receiver is configured to receive the signal of the signal format to be used on the basis of a result of determination by the determining section.

(11)

The communication system according to any one of (1) to (10), in which the transmitter transmits the transmission signal to the receiver through a transmission path, and the control signal transmitter transmits the first instruction information to the control signal receiver through the transmission path.

(12)

A transmission device including:

a transmission data generator that is configured to generate transmission data;

a pattern generator that is configured to generate an alternate pattern alternating at every lapse of a predetermined time;

a transmitter that includes a first equalization circuit and is configured to transmit a transmission signal including the transmission data and the alternate pattern, the first equalization circuit that is configured to adjust equalization characteristics on the basis of first instruction information; and a control signal receiver that is configured to receive the first instruction information transmitted from a reception device that is configured to generate the first instruction information on the basis of a frequency component corresponding to the predetermined time of the alternate pattern included in the transmission signal.

(13)

The transmission device according to (12), in which the pattern generator is configured to change a time length of the predetermined time.

(14)

The transmission device according to (13), in which the transmitter is configured to transmit signals of a plurality of signal formats, the alternate pattern included in the transmission signal includes a plurality of frequency components corresponding to the predetermined times different from each other, the reception device is configured to determine a signal format to be used from the plurality of signal formats on the basis of the plurality of frequency components, and is configured to generate second instruction information on the basis of a result of such determination, the control signal receiver is configured to receive the second instruction information, and the transmitter is configured to transmit a signal of the signal format to be used on the basis of the second instruction information.

(15)

A reception device including:

a receiver that includes a second equalization circuit and is configured to receive a transmission signal transmitted from a transmission device, the second equalization circuit that is configured to adjust equalization characteristics, the transmission device that is configured to transmit the transmission signal, and the transmission signal including transmission data and an alternate pattern alternating at every lapse of a predetermined time;

a first detector that is configured to detect a frequency component corresponding to the predetermined time of the alternate pattern included in the transmission signal; and a control signal transmitter that is configured to generate first instruction information on the basis of a result of detection by the first detector and is configured to transmit the first instruction information.

(16)

The reception device according to (15), further including a determining section, in which the receiver is configured to receive signals of a plurality of signal formats, the transmission device is configured to change a time length of the predetermined time, the alternate pattern included in the transmission signal includes a plurality of frequency components corresponding to the predetermined times different from each other, the first detector is configured to detect the plurality of frequency components, the determining section is configured to determine a signal format to be used from the plurality of signal formats on the basis of the plurality of the frequency components detected by the first detector, the control signal transmitter is configured to generate second instruction information on the basis of a result of determination by the determining section, and is configured to transmit the second instruction information, and the receiver is configured to receive a signal of the signal format to be used on the basis of a result of determination by the determining section.

This application claims the benefit of Japanese Priority Patent Application JP2018-196633 filed with the Japan Patent Office on Oct. 18, 2018, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication system comprising:
a transmission device including a transmission data generator, a pattern generator, a transmitter, and a control signal receiver, the transmission data generator being configured to generate transmission data, the pattern generator being configured to generate an alternate pattern alternating at every lapse of a predetermined time, the transmitter including a first equalization circuit and is configured to transmit a transmission signal including the transmission data and the alternate pattern, the first equalization circuit being configured to adjust equalization characteristics on a basis of first instruction information, and the control signal receiver being configured to receive the first instruction information; and
a reception device including a receiver, a first detector, and a control signal transmitter, the receiver being configured to receive the transmission signal, the first detector being configured to detect a frequency component corresponding to the predetermined time of the alternate pattern included in the transmission signal, and the control signal transmitter being configured to generate the first instruction information on a basis of a result of detection by the first detector and is configured to transmit the first instruction information.

2. The communication system according to claim 1, wherein
the pattern generator is configured to change a time length of the predetermined time.

3. The communication system according to claim 2, wherein
the alternate pattern included in the transmission signal includes a plurality of frequency components corresponding to the predetermined times different from each other,
the first detector is configured to detect the plurality of frequency components, and
the control signal transmitter is configured to generate the first instruction information on a basis of the plurality of frequency components detected by the first detector.

4. The communication system according to claim 3, wherein
the control signal transmitter is configured to generate the first instruction information on a basis of some of the plurality of frequency components detected by the first detector.

5. The communication system according to claim 1, wherein
the transmission device further includes a pulse generator that is configured to generate a single pulse,
the transmission signal includes the single pulse, in the transmission signal,
the single pulse is provided preceding the alternate pattern,
the reception device includes a second detector that is configured to detect a reflected pulse corresponding the single pulse included in the transmission signal, and
the control signal transmitter is configured to generate the first instruction information on a basis of a result of detection by the second detector.

6. The communication system according to claim 1, wherein
the transmission device further includes a pulse generator that is configured to generate a single pulse,
the transmission signal includes the single pulse,
in the transmission signal, the single pulse is provided preceding the alternate pattern,
the reception device includes a second detector that is configured to detect a reflected pulse corresponding the single pulse included in the transmission signal, and
the receiver includes a second equalization circuit that is configured to adjust equalization characteristics on a basis of a result of detection by the second detector.

7. The communication system according to claim 1, wherein
the transmission device further includes a pulse generator that is configured to generate a single pulse,
the transmission signal includes the single pulse,
in the transmission signal, the single pulse is provided preceding the alternate pattern,
the transmission device includes a third detector that is configured to detect a reflected pulse corresponding the single pulse included in the transmission signal, and
the first equalization circuit is configured to adjust equalization characteristics on a basis of a result of detection by the third detector.

8. The communication system according to claim 1, wherein
the pattern generator is configured to further generate a training pattern,
the transmission signal includes the training pattern,
in the transmission signal, the training pattern is provided following the alternate pattern and preceding the transmission data,
the reception device includes a waveform detector that detects a waveform of a signal corresponding to the training pattern in the receiver,
the receiver includes a second equalization circuit of a decision feedback type and a third equalization circuit of a continuous-time type, the second equalization circuit being configured to adjust equalization characteristics, the third equalization circuit being provided in a stage preceding the second equalization circuit and is configured to adjust equalization characteristics, and
the first equalization circuit, the second equalization circuit, and the third equalization circuit are configured to adjust equalization characteristics on a basis of a result of detection by the waveform detector.

9. The communication system according to claim 1, wherein
in the transmission signal, the transmission data is provided following the alternate pattern,
the reception device includes a waveform detector that detects a waveform of a signal based on the transmission data in the receiver,
the receiver includes a second equalization circuit of a decision feedback type and a third equalization circuit of a continuous-time type, the second equalization circuit is configured to adjust equalization characteristics, the third equalization circuit is provided in a stage preceding the second equalization circuit and is configured to adjust equalization characteristics, and
the first equalization circuit, the second equalization circuit, and the third equalization circuit are configured to adjust equalization characteristics on a basis of a result of detection by the waveform detector.

10. The communication system according to claim 1, wherein
the communication system is configured to transmit and receive signals of a plurality of signal formats, the pattern generator is configured to change a time length of the predetermined time, the alternate pattern included in the transmission signal includes a plurality of frequency components corresponding to the predetermined times different from each other, the first detector is configured to detect the plurality of frequency components, the reception device is configured to determine a signal format to be used from the plurality of signal formats on a basis of the plurality of the frequency components detected by the first detector, the control signal transmitter is configured to generate second instruction information on a basis of a result of the determination of the signal format, and is configured to transmit the second instruction information, the control signal receiver is configured to receive the second instruction information, the transmitter is configured to transmit a signal of the signal format to be used on a basis of the second instruction information, and the receiver is configured to receive the signal of the signal format to be used on a basis of a result of the determination of the signal format.

11. The communication system according to claim 1, wherein the transmitter transmits the transmission signal to the receiver through a transmission path, and the control signal transmitter transmits the first instruction information to the control signal receiver through the transmission path.

12. A transmission device comprising:

a transmission data generator that is configured to generate transmission data; a pattern generator that is configured to generate an alternate pattern alternating at every lapse of a predetermined time;

a transmitter that includes a first equalization circuit and is configured to transmit a transmission signal including the transmission data and the alternate pattern, the first equalization circuit being configured to adjust equalization characteristics on a basis of first instruction information; and a control signal receiver that is configured to receive the first instruction information transmitted from a reception device that is configured to generate the first instruction information on a basis of a frequency component corresponding to the predetermined time of the alternate pattern included in the transmission signal.

13. The transmission device according to claim 12, wherein the pattern generator is configured to change a time length of the predetermined time.

14. The transmission device according to claim 13, wherein the transmitter is configured to transmit signals of a plurality of signal formats, the alternate pattern included in the transmission signal includes a plurality of frequency components corresponding to the predetermined times different from each other, the reception device is configured to determine a signal format to be used from the plurality of signal formats on a basis of the plurality of frequency components, and is configured to generate second instruction information on a basis of a result of such determination, the control signal receiver is configured to receive the second instruction information, and the transmitter is configured to transmit a signal of the signal format to be used on a basis of the second instruction information.

15. A reception device comprising:

a receiver that includes a equalization circuit and is configured to receive a transmission signal transmitted from a transmission device, the equalization circuit that is configured to adjust equalization characteristics, the transmission device being configured to transmit the transmission signal, and the transmission signal including transmission data and an alternate pattern alternating at every lapse of a predetermined time;

a first detector that is configured to detect a frequency component corresponding to the predetermined time of the alternate pattern included in the transmission signal; and a control signal transmitter that is configured to generate first instruction information on a basis of a result of detection by the first detector and is configured to transmit the first instruction information.

16. The reception device according to claim 15, wherein the receiver is configured to receive signals of a plurality of signal formats, the transmission device is configured to change a time length of the predetermined time, the alternate pattern included in the transmission signal includes a plurality of frequency components corresponding to the predetermined times different from each other, the first detector is configured to detect the plurality of frequency components, the reception device is configured to determine a signal format to be used from the plurality of signal formats on a basis of the plurality of the frequency components detected by the first detector, the control signal transmitter is configured to generate second instruction information on a basis of a result of the determination of the signal format, and is configured to transmit the second instruction information, and the receiver is configured to receive a signal of the signal format to be used on a basis of a result of the determination of the signal format.

* * * * *